US012409094B2

(12) United States Patent
Noskowicz et al.

(10) Patent No.: US 12,409,094 B2
(45) **Date of Patent: *Sep. 9, 2025**

(54) HEEL PROTECTOR AND CORRESPONDING REHABILITATION SYSTEMS AND METHODS FOR USING THE SAME

(71) Applicant: Medline Industries, LP, Northfield, IL (US)

(72) Inventors: David S. Noskowicz, Spring Grove, IL (US); Margaret Falconio-West, Round Lake, IL (US)

(73) Assignee: Medline Industries LP, Northfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/142,986

(22) Filed: May 3, 2023

(65) Prior Publication Data

US 2023/0270620 A1 Aug. 31, 2023

Related U.S. Application Data

(63) Continuation of application No. 16/859,076, filed on Apr. 27, 2020, now Pat. No. 11,771,616, which is a (Continued)

(51) Int. Cl.
*A61H 9/00* (2006.01)

(52) U.S. Cl.
CPC ........... *A61H 9/005* (2013.01); *A61H 9/0092* (2013.01); *A61H 2201/0111* (2013.01);

(Continued)

(58) Field of Classification Search
CPC .................. A61H 9/005; A61H 9/0092; A61H 2201/0111; A61H 2201/0214;

(Continued)

(56) References Cited

U.S. PATENT DOCUMENTS 1,562,454 A 11/1925 Jankins
3,011,494 A 12/1961 McGowan (Continued)

FOREIGN PATENT DOCUMENTS

WO 94/01071 1/1994

OTHER PUBLICATIONS

Patel, Tarla , "Notice of Allowance", U.S. Appl. No. 18/142,920, filed May 3, 2023; Mailed Mar. 29, 2024.

(Continued)

*Primary Examiner* — Timothy A Stanis
(74) *Attorney, Agent, or Firm* — Philip H. Burrus, IV

(57) ABSTRACT

A device (900) includes a leg engaging section (101) and a foot engaging section (102 intersecting at a heel receiver (103). The leg engaging section and the foot engaging section defining a leg insertion aperture (104). A first compression wrap member (301) and a second compression wrap member (302) extend from the leg engaging section. An inflatable bladder (501) can be disposed along the leg engaging section between the leg insertion aperture and a compressible cushion layer (902). The inflatable bladder can be selectively inflatable through a connection tube (502) exiting the inflatable bladder at a non-orthogonal angle (504) relative to an edge (507) of the inflatable bladder. The leg engaging section can define at least one channel to permit the connection tube to exit the device.

20 Claims, 15 Drawing Sheets

Related U.S. Application Data continuation of application No. 15/677,958, filed on Aug. 15, 2017, now Pat. No. 10,667,983, which is a continuation of application No. 14/206,395, filed on Mar. 12, 2014, now Pat. No. 9,844,484, which is a continuation-in-part of application No. 13/757,233, filed on Feb. 1, 2013, now Pat. No. 9,439,826, which is a continuation-in-part of application No. 13/649,920, filed on Oct. 11, 2012, now Pat. No. 9,642,559.

(60) Provisional application No. 61/781,682, filed on Mar. 14, 2013.

(52) U.S. Cl.
CPC ................ *A61H 2201/0214* (2013.01); *A61H 2201/0257* (2013.01); *A61H 2201/164* (2013.01); *A61H 2201/165* (2013.01); *A61H 2201/169* (2013.01); *A61H 2201/5002* (2013.01); *A61H 2205/106* (2013.01)

(58) Field of Classification Search
CPC ...... A61H 2201/0257; A61H 2201/164; A61H 2201/165; A61H 2201/169; A61H 2201/5002; A61H 2205/106
See application file for complete search history.

(56) References Cited

U.S. PATENT DOCUMENTS

| | | | | |
|---|---|---|---|---|
| 3,216,417 | A | 11/1965 | Posey | |
| 3,279,459 | A | 10/1966 | Schenker | |
| 3,490,450 | A | 1/1970 | Gardner | |
| 3,648,291 | A | 3/1972 | Pankers | |
| 3,674,023 | A | 7/1972 | Mann | |
| 3,693,619 | A | 9/1972 | Williams | |
| D225,472 | S | 12/1972 | Lowrey et al. | |
| 3,721,237 | A | 3/1973 | Alessio | |
| 3,905,135 | A | 9/1975 | Debusk | |
| D239,058 | S | 3/1976 | Gaylord, Jr. | |
| 3,955,565 | A | 5/1976 | Johnson, Jr. | |
| 4,135,504 | A | 1/1979 | Spann | |
| 4,186,738 | A | 2/1980 | Schleicher et al. | |
| 4,266,298 | A | 5/1981 | Graziano | |
| D261,821 | S | 11/1981 | Hubbard et al. | |
| D268,365 | S | 3/1983 | Malkin | |
| 4,441,493 | A | 4/1984 | Nirschl | |
| 4,445,505 | A | 5/1984 | Labour | |
| 4,573,482 | A | 3/1986 | Williams, Jr. | |
| 4,597,395 | A | 7/1986 | Barlow et al. | |
| 4,624,244 | A | 11/1986 | Taheri | |
| 4,730,610 | A | 3/1988 | Graebe | |
| RE32,680 | E | 5/1988 | Pompa | |
| 4,781,133 | A | 11/1988 | Hanyu et al. | |
| 4,947,834 | A | 8/1990 | Kartheus et al. | |
| 4,972,832 | A | 11/1990 | Trapini et al. | |
| 5,052,128 | A | 10/1991 | Lonardo | |
| 5,085,210 | A | 2/1992 | Smith, III | |
| 5,226,245 | A | 7/1993 | Lamont | |
| D338,067 | S | 8/1993 | Luber et al. | |
| D343,002 | S | 1/1994 | Gauvry | |
| 5,288,286 | A | 2/1994 | Davis et al. | |
| D352,381 | S | 11/1994 | Rose | |
| 5,367,789 | A | 11/1994 | Lamont | |
| 5,435,009 | A | 7/1995 | Schild et al. | |
| 5,449,339 | A | 9/1995 | Drennan | |
| 5,464,385 | A | 11/1995 | Grim | |
| 5,479,471 | A | 12/1995 | Buckland | |
| 5,511,552 | A | 4/1996 | Johnson | |
| 5,588,954 | A | 12/1996 | Ribando | |
| 5,609,570 | A | 3/1997 | Lamont | |
| 5,626,556 | A | 5/1997 | Tobler et al. | |
| 5,649,954 | A | 7/1997 | McEwen | |
| 5,660,182 | A | 8/1997 | Kuroshaki et al. | |
| 5,827,211 | A | 10/1998 | Sellinger | |
| 5,833,639 | A | 11/1998 | Nunes et al. | |
| 5,868,690 | A | 2/1999 | Eischen, Sr. | |
| D410,746 | S | 6/1999 | Klein | |
| 6,080,120 | A | 6/2000 | Sandman et al. | |
| 6,126,627 | A | 10/2000 | Brennan | |
| 6,152,893 | A | 11/2000 | Pigg et al. | |
| 6,277,087 | B1 | 8/2001 | Hess et al. | |
| 6,308,713 | B1 | 10/2001 | Coleman | |
| 6,322,530 | B1 | 11/2001 | Johnson, Jr. et al. | |
| 6,338,723 | B1 | 1/2002 | Carpenter et al. | |
| D453,969 | S | 2/2002 | Callsen et al. | |
| D455,836 | S | 4/2002 | Lammers | |
| 6,572,573 | B1 | 6/2003 | Klein | |
| 6,640,810 | B1 | 11/2003 | Callsen et al. | |
| 7,004,920 | B2 | 2/2006 | Fareed | |
| D517,306 | S | 3/2006 | Hoeft | |
| 7,052,479 | B2 | 5/2006 | Drennan | |
| 7,115,105 | B2 | 10/2006 | Cropper | |
| D542,921 | S | 5/2007 | Ponsi et al. | |
| D544,101 | S | 6/2007 | Kistner | |
| 7,252,647 | B1 | 8/2007 | Hely | |
| D551,354 | S | 9/2007 | McBarnett et al. | |
| 7,276,037 | B2 | 10/2007 | Ravikumar | |
| 7,329,232 | B2 | 2/2008 | Moses et al. | |
| D571,083 | S | 6/2008 | Mohammad | |
| 7,455,651 | B2 | 11/2008 | Mollica | |
| 7,458,948 | B2 | 12/2008 | Drennan | |
| 7,798,984 | B2 | 9/2010 | Ponsi et al. | |
| 8,152,749 | B2 | 4/2012 | Ponsi et al. | |
| 8,216,165 | B2 | 7/2012 | Ravikumar et al. | |
| 8,241,263 | B2 | 8/2012 | Mills | |
| 8,251,932 | B2 | 8/2012 | Fout | |
| 8,435,199 | B2 | 5/2013 | Ponsi et al. | |
| D697,628 | S | 1/2014 | Drey et al. | |
| 8,628,487 | B2 | 1/2014 | Ponsi | |
| 8,894,598 | B2 | 11/2014 | Ponsi et al. | |
| D731,158 | S | 6/2015 | Backus | |
| D749,744 | S | 2/2016 | Drey | |
| 9,439,826 | B2 | 9/2016 | Drey | |
| 9,844,484 | B2 | 12/2017 | Noskowicz | |
| 9,980,845 | B2 | 5/2018 | Drey et al. | |
| 10,292,895 | B2 | 5/2019 | Drey | |
| 10,667,983 | B2 | 6/2020 | Noskowicz | |
| 10,779,981 | B2 | 9/2020 | Drey | |
| 11,273,095 | B2 | 3/2022 | Drey | |
| 11,752,023 | B2 | 9/2023 | Drey | |
| 11,771,616 | B2 | 10/2023 | Noskowicz | |
| 11,793,710 | B2 | 10/2023 | Drey | |
| 2001/0051240 | A1 | 12/2001 | Denis | |
| 2003/0168063 | A1 | 9/2003 | Gambone et al. | |
| 2004/0111048 | A1 | 6/2004 | Jensen et al. | |
| 2004/0236258 | A1 * | 11/2004 | Burns ..................... | A61F 5/012 602/13 |
| 2004/0236261 | A1 | 11/2004 | McCarthy | |
| 2005/0131321 | A1 | 6/2005 | Ravikumar | |
| 2005/0171461 | A1 | 8/2005 | Pick | |
| 2005/0192524 | A1 | 9/2005 | Lipshaw et al. | |
| 2007/0032773 | A1 | 2/2007 | Magee | |
| 2007/0033697 | A1 | 2/2007 | Soldwedel | |
| 2007/0074427 | A1 | 4/2007 | Ponsi et al. | |
| 2007/0197988 | A1 | 8/2007 | Bieling | |
| 2007/0282230 | A1 | 12/2007 | Valderrabano | |
| 2008/0022559 | A1 | 1/2008 | Ponsi | |
| 2009/0076427 | A1 | 3/2009 | Ponsi | |
| 2009/0149791 | A1 | 6/2009 | Ponsi et al. | |
| 2009/0227927 | A1 | 9/2009 | Frazer | |
| 2010/0082060 | A1 | 4/2010 | Avitable | |
| 2010/0087765 | A1 | 4/2010 | Gainey | |
| 2010/0152638 | A1 | 6/2010 | Ponsi et al. | |
| 2010/0312160 | A1 | 12/2010 | Creighton et al. | |
| 2010/0324517 | A1 | 12/2010 | Lenhult et al. | |
| 2010/0326442 | A1 | 12/2010 | Hamilton | |
| 2011/0125183 | A1 | 5/2011 | Lipshaw et al. | |
| 2011/0180074 | A1 | 7/2011 | Gainey | |
| 2012/0012118 | A1 | 1/2012 | Ponsi et al. | |
| 2012/0179082 | A1 | 7/2012 | Ponsi et al. | |
| 2012/0193957 | A1 | 8/2012 | Grover | |
| 2012/0209158 | A1 | 8/2012 | Avitable et al. | |

(56) References Cited

U.S. PATENT DOCUMENTS

| | | | |
|---|---|---|---|
| 2013/0085427 | A1 | 4/2013 | Malhi |
| 2013/0085432 | A1 | 4/2013 | Malhi et al. |
| 2013/0123636 | A1 | 5/2013 | Longmore |
| 2013/0239976 | A1 | 9/2013 | Purdy |
| 2014/0107547 | A1 | 4/2014 | Drey et al. |
| 2014/0173940 | A1 | 6/2014 | Drennan |
| 2014/0194796 | A1 | 7/2014 | Noskowicz et al. |
| 2021/0053536 | A1 | 2/2021 | Ichiyanagi |

OTHER PUBLICATIONS

"Calibrated V-Lok Cuff", Calibrated V-Lok Cuff Specification Publication; Publicly available more than one year prior to the filing date of the present application.; Printed Sep. 2012; p. 1.
"DeRoyal Medical Products PRUventor", "PRUventor Heel Off-loading Device"; Publication Date Unknown but believed to be before the filing date of the present application; http://www.deroyal.com/MedicalProducts/.
"Flowtron Universal", Arjo Huntleigh Publication; Flowtron Universal Publication; Published 2009; pp. 1-4.
"Medline Catalog", BioCompression Pneumatic Sleeves by Alimed; Medline Catalog; http://www.medline.com/catalog/catalog.jsp; Unknown Publication date but believed to be prior to present application filing date.
"Medline Catalog", Comfort Lined Sleeve by Ecolab/Microtek; Medline Catalog; http://www.medline.com/catalog/catalog.jsp; Unknown Publication date but believed to be prior to present application filing date.
"Medline Catalog", EHOB Foot Waffle Heel Elevator by Alimed; Medline Catalog; http://www.medline.com/catalog/catalog.jsp; Unknown Publication date but believed to be prior to present application filing date.
"Medline Catalog", Flowtron Compression Garments by Gentinge; Medline Catalog; http://www.medline.com/catalog/catalog.jsp; Unknown Publication date but believed to be prior to present application filing date.
"Medline Catalog", Foot Waffle Air Cushion by Patterson Med; Medline Catalog; http://www.medline.com/catalog/catalog.jsp; Unknown Publication date but believed to be prior to present application filing date.
"Medline Catalog", Foot Waffle Custom by Ehob; Medline Catalog; http://www.medline.com/catalog/catalog.jsp; Unknown Publication date but believed to be prior to present application filing date.
"Medline Catalog", Foot Waffle Heel Elevator Custom by Ehob; Medline Catalog; http://www.medline.com/catalog/catalog.jsp; Unknown Publication date but believed to be prior to present application filing date.
"Medline Catalog", Kendall SCD Compression System by Medtronic; Medline Catalog; http://www.medline.com/catalog/catalog.jsp; Unknown Publication date but believed to be prior to present application filing date.
"Medline Catalog", Leg Compression Garments by Currie Medical; Medline Catalog; http://www.medline.com/catalog/catalog.jsp; Unknown Publication date but believed to be prior to present application filing date.
"Medline Catalog", Prevalon Heel Protectors by Sage Products; Medline Catalog; http://www.medline.com/catalog/catalog.jsp; Unknown Publication date but believed to be prior to present application filing date.
"Medline Catalog", Rolyan Neoprene Elbow Sleeve By Patters; Medline Catalog; http://www.medline.com/catalog/catalog.jsp; Unknown Publication date but believed to be prior to present application filing date.
"Medline Catalog", SCD Express Compression System by Covidien; Medline Catalog; http://www.medline.com/catalog/catalog.jsp; Unknown Publication date but believed to be prior to present application filing date.
"Medline Catalog", SCD Express Sleeve (Knee Length) by Stryker; Medline Catalog; http://www.medline.com/catalog/catalog.jsp; Unknown Publication date but believed to be prior to present application filing date.
"Medline Catalog", SCD Express Thigh Length Sleeves by Covidien; Medline Catalog; http://www.medline.com/catalog/catalog.jsp; Unknown Publication date but believed to be prior to present application filing date.
"Medline Catalog", VasoGrad Dvt Sleeves by Compression Therapy Concepts; Medline Catalog; http://www.medline.com/catalog/catalog.jsp; Unknown Publication date but believed to be prior to present application filing date.
"Medline Catalog", Waffle FootHold Splint with Anti-Rotation; Medline Catalog; http://www.medline.com/catalog/catalog.jsp; Unknown Publication date but believed to be prior to present application filing date.
"Medline Catalog", Waffle FootHold with Secure stick Sole by Ehob; Medline Catalog; http://www.medline.com/catalog/catalog.jsp; Unknown Publication date but believed to be prior to present application filing date.
"Medline Catalog", Waffle FootHold with Splint by Ehob; Medline Catalog; http://www.medline.com/catalog/catalog.jsp; Unknown Publication date but believed to be prior to present application filing date.
"Medline Catalog", Waffle Heel Elevator by Ehob; Medline Catalog; http://www.medline.com/catalog/catalog.jsp; Unknown Publication date but believed to be prior to present application filing date.
"Medline Catalog", Waffle Heel Protectors by Ehob; Medline Catalog; http://www.medline.com/catalog/catalog.jsp; Unknown Publication date but believed to be prior to present application filing date.
"Website", Covidien Vascular Compression Products; www.covidien.com/vascularcompression/pages.aspx; Publicly available prior to filing of this application.
Han, Inho, "PCT Search Report and Written Opinion", PCT/US2013/063852; Filed Oct. 8, 2013; Mailed Jan. 8, 2014.
Han, Inho, "PCT Search Report and Written Opinion", PCT/US2014/026259; Filed Mar. 13, 2014; Mailed Jul. 7, 2014.
Krakower, Susan, "Final OA", U.S. Appl. No. 29/473,963, filed Nov. 27, 2013; Mailed Jul. 7, 2014.
Krakower, Susan, "NonFinal OA", U.S. Appl. No. 29/473,963, filed Nov. 27, 2013; Mailed Jan. 24, 2014.
Krakower, Susan, "Notice of Allowance", U.S. Appl. No. 29/444,693, filed Feb. 1, 2013; Mailed Aug. 27, 2013.
Krawkower, Susan, "Notice of Allowance", U.S. Appl. No. 29/473,963, filed Nov. 27, 2013; Mailed Oct. 20, 2015.
Kroakower, Susan, "Ex Parte Quayle", U.S. Appl. No. 29/473,963, filed Nov. 27, 2013; mailed Feb. 20, 2015.
Patel, Tarla, "NonFinal Office Action", U.S. Appl. No. 14/468,872, filed Aug. 26, 2014; Mailed Aug. 8, 2017.
Patel, Tarla, "Notice of Allowance", U.S. Appl. No. 15/892,186, filed Feb. 8, 2018; Mailed Aug. 26, 2020.
Patel, Tarla R., "Notice of Allowance", U.S. Appl. No. 16/993,737, filed Aug. 14, 2020; Mailed Sep. 28, 2022.
Shin, Ju C., "PCT Search Report and Written Opinion", PCT/US2014/013780; File Jan. 30, 2014; Mailed May 19, 2014.
Stanis, Timothy, "Final OA", U.S. Appl. No. 13/649,920, filed Oct. 11, 2012; Mailed Jun. 2, 2016.
Stanis, Timothy, "Final OA", U.S. Appl. No. 13/757,233, filed Feb. 1, 2013; Mailed Apr. 18, 2016.
Stanis, Timothy, "Final OA", U.S. Appl. No. 14/206,395, filed Mar. 12, 2014; Mailed Nov. 21, 2016.
Stanis, Timothy, "NonFinal OA", U.S. Appl. No. 13/649,920, filed Oct. 11, 2012; Mailed Dec. 2, 2015.
Stanis, Timothy, "NonFinal OA", U.S. Appl. No. 13/757,233, filed Feb. 1, 2013; Mailed Oct. 2, 2015.
Stanis, Timothy, "NonFinal OA", U.S. Appl. No. 14/206,395, filed Mar. 12, 2014; Mailed May 16, 2016.
Stanis, Timothy, "NonFinal OA", U.S. Appl. No. 15/260,918, filed Sep. 9, 2016; Mailed Sep. 14, 2018.
Stanis, Timothy, "NonFinal OA", U.S. Appl. No. 15/677,958, filed Aug. 15, 2017; Mailed Oct. 2, 2019.
Stanis, Timothy, "NonFinal Office Action", U.S. Appl. No. 16/278,318, filed Apr. 8, 2019; Mailed Jul. 20, 2021.

(56) References Cited

OTHER PUBLICATIONS

Stanis, Timothy, "NonFinal Office Action", U.S. Appl. No. 16/859,076, filed Apr. 27, 2020; Mailed Feb. 28, 2022.
Stanis, Timothy, "NonFinal Office Action", U.S. Appl. No. 16/859,076, filed Apr. 27, 2020; Mailed Dec. 15, 2022.
Stanis, Timothy, "Non-Final Office Action", U.S. Appl. No. 17/410,237, filed Aug. 24, 2021; Mailed Apr. 28, 2023.
Stanis, Timothy, "Notice of Allowance", U.S. Appl. No. 13/649,920, filed Oct. 11, 2012; Mailed Jan. 13, 20167.
Stanis, Timothy, "Notice of Allowance", U.S. Appl. No. 13/649,920, filed Oct. 11, 2012; Mailed Oct. 6, 2016.
Stanis, Timothy, "Notice of Allowance", U.S. Appl. No. 13/757,233, filed Feb. 1, 2013; Mailed Jun. 22, 2016.
Stanis, Timothy, "Notice of Allowance", U.S. Appl. No. 14/206,395, filed Mar. 12, 2014; Mailed May 18, 2017.
Stanis, Timothy, "Notice of Allowance", U.S. Appl. No. 15/260,918, filed Sep. 9, 2016; Mailed Jan. 7, 2019.
Stanis, Timothy A., "Final Office Action", U.S. Appl. No. 16/859,076, filed Apr. 27, 2020; Mailed Sep. 1, 2022.
Watkins, Jennifer, "Final OA", U.S. Appl. No. 29/500,542, filed Aug. 26, 2014; Mailed Jun. 28, 2016.
Watkins, Jennifer, "NonFinal OA", U.S. Appl. No. 29/500,542, filed Aug. 26, 2014; Mailed Mar. 8, 2016.
Watkins, Jennifer, "Notice of Allowance", U.S. Appl. No. 29/500,542, filed Aug. 26, 2014; Mailed Nov. 2, 2016.

* cited by examiner

HEEL PROTECTOR AND CORRESPONDING REHABILITATION SYSTEMS AND METHODS FOR USING THE SAME

CROSS REFERENCE TO PRIOR APPLICATIONS

This application is a continuation application from, and therefore claims priority to, U.S. Ser. No. 16/859,076, filed Apr. 27, 2020, which is a continuation application from, and therefore claims priority to U.S. Ser. No. 15/677,958, filed Aug. 15, 2017, which is a continuation application from, and therefore claims priority to, U.S. Ser. No. 14/206,395, filed Mar. 12, 2014, which claims priority and benefit under 35 U.S.C. § 119(e) from U.S. Provisional Application No. 61/781,682, filed Mar. 14, 2013, each of which is incorporated herein by reference. U.S. Ser. No. 14/206,395 is a continuation-in-part of, and therefore claims priority to, U.S. Ser. No. 13/757,233, filed Feb. 1, 2013, which is a continuation-in-part of, and therefore claims priority to, U.S. Ser. No. 13/649,920, filed Oct. 11, 2012, each of which is incorporated by reference for all purposes.

BACKGROUND

Technical Field

This disclosure relates generally to therapy systems, and more particularly to devices for preventing complications during therapy.

Background Art

Limb protection devices, including boots, braces, wraps, socks, sleeves, and the like are used to protect a patient's limbs. These devices can be used for a variety of reasons, including limb elevation, limb pressure alleviation, limb protection, and limb strengthening.

While many of these devices work reasonably well in practice, problems with their usage exist. When left on for long periods of time, or when used incorrectly, these devices can sometimes lead to skin breakdown or the formation of pressure ulcers. Where this occurs, the therapeutic device creates new medical conditions that must be treated while aiding in the rehabilitation of previously existing conditions. These new issues only serve to extend the overall rehabilitation time for the patient. Accordingly, it would be advantageous to have an improved therapeutic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
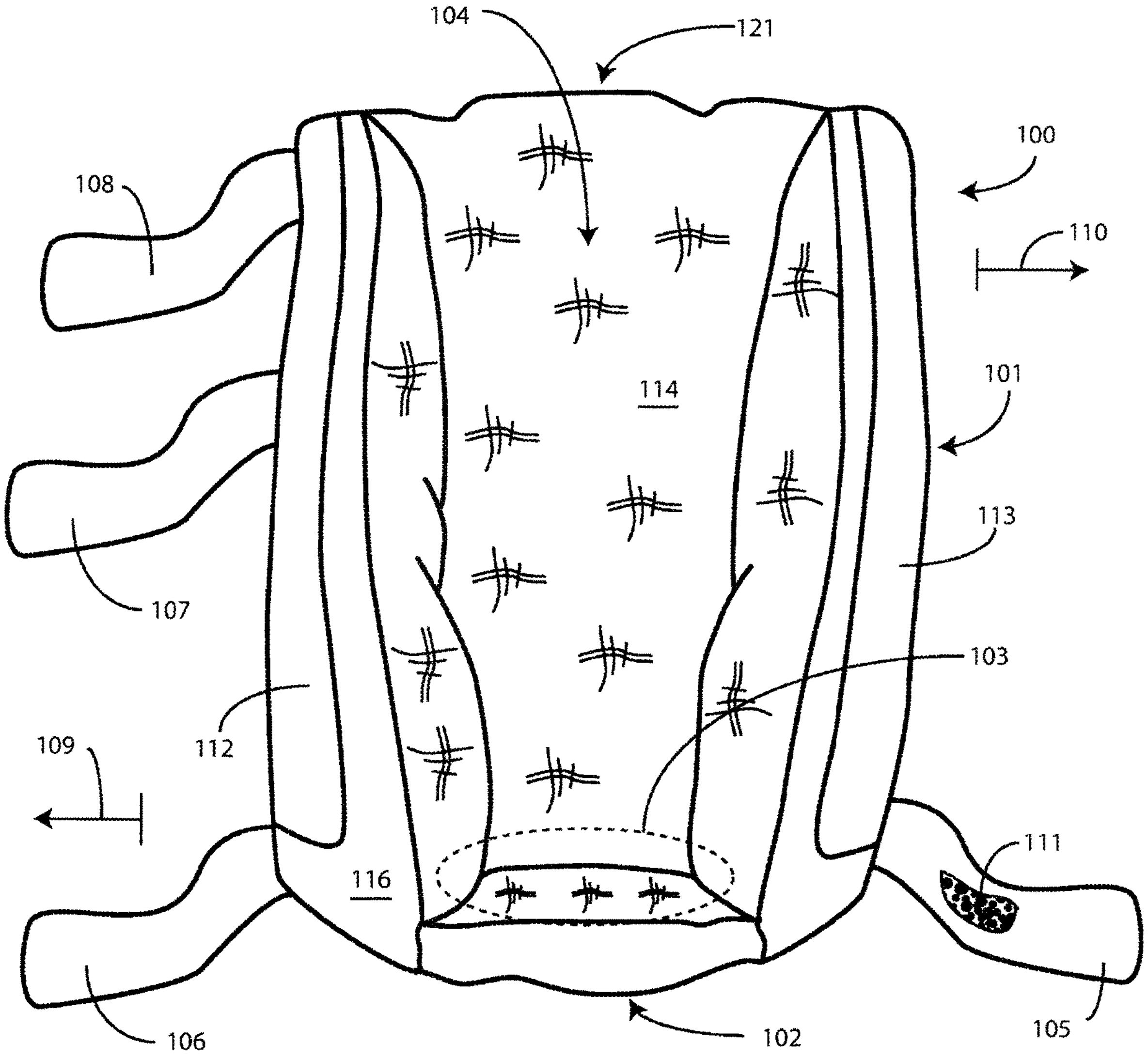
FIGS. 1 and 2 illustrate one explanatory portion of a device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present disclosure provide a cushioned device that is configured both for compression therapy and for providing protection to a person's leg, foot, or heel during rehabilitation. In one embodiment, a device includes a leg engaging section and a foot engaging section. The leg engaging section and the foot engaging section intersect at a heel receiver. In one embodiment, the leg engaging section and the foot engaging section define a leg insertion aperture into which a patient's leg map be placed. To provide protection for the patient's leg during treatment or rehabilitation, in one embodiment the leg engaging section includes a compressible cushion layer. The compressible cushion layer can be an organic batting, such as a cotton or wool batting, or may alternatively be an inorganic batting, such as a poly fiber fill, compressible foam, or a synthetic material. Of course, combinations of organic batting materials and inorganic batting materials may also be used.

To provide compression therapy concurrently with the delivery of protection, in one embodiment the device has integrated therewith a first compression wrap member and a second compression wrap. The first compression wrap member and the second compression wrap member each extend from the leg engaging section. In one embodiment the first compression wrap member and the second compression wrap member are disposed internal to the device, with side portions of the leg engaging section disposed outside the first compression wrap member and the second compression wrap member. In this configuration, the first compression wrap member and the second compression wrap member can be secured about the patient's limb prior to wrapping the soft, cushioned sides of the device around the limb.

In one embodiment, an inflatable bladder is disposed along the leg engaging section. In one embodiment, the inflatable bladder is disposed between the leg insertion aperture and the compressible cushion layer so as to be adjacent to the patient's limb. Said differently, positioning the inflatable bladder between the patient's limb and the compressible cushion layer ensures compression occurs when the first compression wrap member and second compression wrap member are secured about the patient's leg.

In one embodiment, the inflatable bladder is selectively inflatable through a connection tube. Embodiments of the disclosure contemplate that devices in accordance with embodiments of the disclosure can be worn by patients that are bed ridden for given amounts of time to reduce pressure ulcers from forming on the lower legs and feet. At the same time, embodiments provide the first compression wrap member and the second compression wrap member, which working with the inflatable bladder, provides compression therapy.

Compression therapy may be required to prevent deep vein thrombosis (DVT) or venous thrombo-embolisms, which are conditions where clots form in the blood. Patients undergoing surgery, under anesthesia, or undergoing extended periods of bed rest are at risk of clotting conditions associated with DVT. The clotting conditions frequently occur in the deep veins of the lower extremities, such as in the lower legs, due to the tendency of blood to accumulate or pool in these areas. Static pools of blood can give rise to clotting conditions. Where clots form, circulation can be compromised, thereby putting the patient's health at risk. Further, clots can break free, which puts the patient at risk for embolism, which in some circumstances can be life threatening. Application of a compression device can work to prevent pooling, thereby reducing the risk that a clot will form.

However, the inventors of embodiments of the present disclosure have come to understand that the use of a compression device with a conventional heel offloading boot or limb covering creates new problems. Specifically, when using compression devices with boots or other coverings there is an increased risk of skin breakdown due to the fact that tubing from the compression device can come into contact with the patient's skin when the boot or other covering is wrapped about the compression device. Prior art boots and coverings provide as much as three inches along which tubing from compression devices can contact the patient's skin. When the tubing is not placed precisely within the boot or covering, it will contact the patient's skin, thereby significantly increasing the risk of skin breakdown. Even when the tubing is placed correctly when the boot or covering is applied, patient movement or tubing manipulation outside the boot or covering can cause the tubing to contact the patient's skin, thereby exacerbating skin breakdown. This problem can be exacerbated due to the fact that the boot or covering is applying pressure that presses the tubing against the patient's skin.

Prior art compression therapy devices can also create unnecessary pressure points, thereby exacerbating the pressure ulcer occurrences. Moreover, traditional compression devices are themselves inherently stiff and apply large amounts of pressure to a patient's limb, which runs counter to the purpose of the pressure ulcers in a protective boot. The tubing of prior art systems is typically hard so as to not be crushed during use, and thereby serves as a prime source of pressure ulcers. As the patient moves around, the tubing can become compromised, can gather, and can bunch, thereby causing unwanted pressure on the skin.

Embodiments of the disclosure provide a novel integrated device that is capable of providing pressure therapy while also providing working to prevent ulcers and other unnecessary maladies by providing cushioning and elevating features as well. In one embodiment, a device is configured as a cushioning boot that has at least a leg engaging section. The cushioning boot may have two sides and a foot engaging section. Each of the leg engaging section, the sides, and the foot engaging section can all include a compressible cushioning layer, manufactured from materials such as batting, foam, and the like, to reduce pressure on a patient's limb during extended bed rest. In one embodiment, the leg engaging section, and optionally the sides or the foot engaging section, also includes an inflatable bladder that can be coupled to an air pump to provide compression therapy.

In one embodiment, the inflatable bladder includes an air port or air port portion that exits the inflatable bladder away from a patient's body and down portions of the device that prevent the port and/or tubing from contacting the patient's limb or skin. For example, in one embodiment the connection tube of the inflatable bladder exits the inflatable bladder at a non-orthogonal angle relative to an edge of the inflatable bladder. In one embodiment, the leg engaging section defines at least one channel to permit the connection tube to exit the device. This diverting path traversed by the port and/or tubing works to reduce the risk of the patient developing a pressure ulcer.

In one embodiment, the inflatable bladder is configured under a top material layer of the leg engaging section. In one embodiment, the inflatable bladder may be disposed along an optional ancillary cushioning layer. Either the compressible cushion layer or the optional ancillary cushioning layer can provide support to reduce the risk of a patient developing pressure ulcers when the inflatable bladder is deflated. When the inflatable bladder is inflated, the cushion layer or the optional ancillary cushioning layer works to facilitate the proper blood circulation effect to the patient's limb, thereby functioning as a deep vein thrombosis (DVT) therapy sleeve. The cushion layer or the optional ancillary cushioning layer may be manufactured from foam. Alternatively, the cushion layer or the optional ancillary cushioning layer may be memory foam, general organic or inorganic batting, or organic or inorganic fill materials. In one embodiment, additional cushion layer or the optional ancillary cushioning layer material is disposed beneath the inflatable bladder. In one additional embodiment, a half inch or less of foam or other cushioning material can be disposed atop the bladder as well.

In one embodiment, the leg engaging section intersects with the foot engaging section and a heel receiver. A leg insertion aperture is defined along the leg engaging section and a foot engaging section. Once the patient's limb is placed within the leg insertion aperture, the first compression wrap member and the second compression wrap member can be fastened about the patient's limb. The first compression wrap member and the second compression wrap member can be configured for providing compression therapy to a patient's limb. In one embodiment, the first compression wrap member and the second compression wrap member are manufactured from a material that can be elasticized and that has an outer face and an inner face. The inner face is disposed against the patient's limb, while the outer face is visible when the wrap is applied to the limb. One of the first compression wrap member or the second compression wrap member defines a proximal edge, a distal edge, and first and second side edges. One of the side edges includes a plurality of attachment tabs that are configured to attach—by hook and loop fastener or other attachment device—to the outer face of the other of the first compression wrap member or the second compression wrap member when each is wrapped about the patient's limb.

Where compression therapy is desired, the inflatable bladder can be inflated. For example, in one application the bladder can be inflated with air to a pressure of forty millimeters of mercury to apply pressure to a patient's limb for compression therapy. If compression therapy is not needed, the bladder can be left flaccid. Regardless of the state of the inflatable bladder, once the first compression wrap member and the second compression wrap member are secured, one or more fastening straps can wrap from one side of the leg engaging portion across the leg insertion aperture to another side of the leg engaging portion to retain the overall compound device on the patient's limb.

In one or more embodiments, the device includes one or more apertures disposed along the leg engaging section. The apertures permit the connection tube extending from the inflatable bladder of a compression device to pass therethrough. Moreover, the connection tubing can be configured to exit the compression device at a non-orthogonal angle, thereby permitting the connection tubing to easily exit the device without risk of contacting the patient's skin.

For example, in one embodiment, to provide a better user experience, the connection tube exits the inflatable bladder at a non-orthogonal angle relative to the distal edge of the inflatable bladder. When the inflatable bladder is disposed beneath the patient's leg, the non-orthogonal angle ensures that the connection tube does not run parallel to the patient's leg, thereby causing discomfort and potential skin breakdown that can occur if the connection tube passes along the patient's Achilles tendon. This angle can also facilitate the connection tube passing conveniently through the apertures in the medial or lateral sides of the leg engaging portion of the device. Advantageously, this both increases comfort for the patient over prior art designs and reduces or eliminates the risk of skin breakdown because the connection tube does not contact the patient's skin. Moreover, embodiments of the disclosure are easier for a health care services provider to apply.

Figure 2:
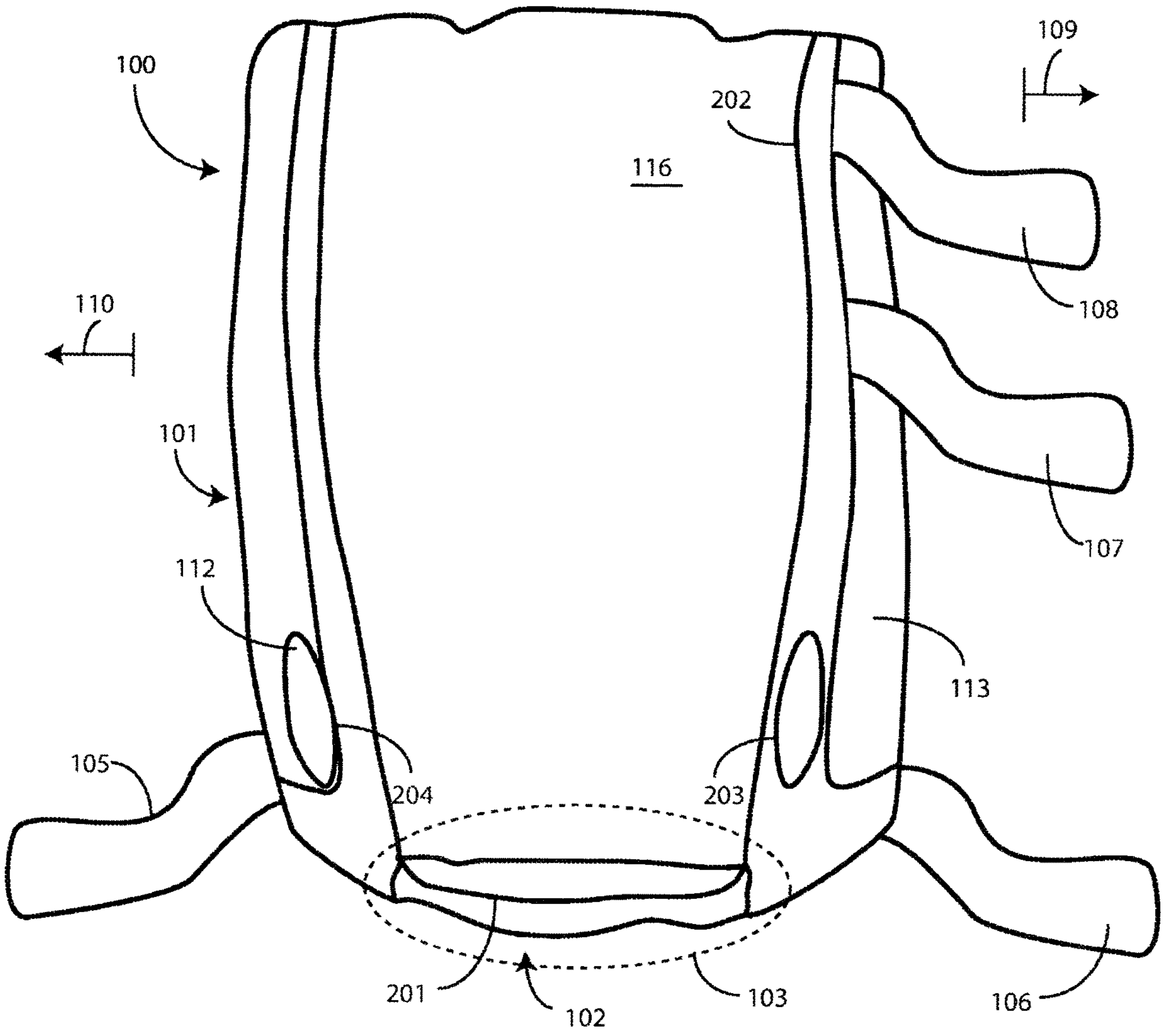

Turning now to FIGS. 1 and 2, illustrated therein is one explanatory portion 100 of a device configured in accordance with one or more embodiments of the disclosure. In the illustrative embodiment of FIGS. 1 and 2, the portion 100 includes a leg engaging section 101 and a foot engaging section 102. The leg engaging section 101 intersects the foot engaging section 102 at a heel receiver 103. In one embodiment, the heel receiver 103 defines an aperture 201 through which a patient's heel can be seen when the portion 100 is applied to the patient's leg. The leg engaging section 101 and the foot engaging section 102 have defined therealong a leg insertion aperture 104. A patient's leg can be inserted through the leg insertion aperture 104, as will be shown in FIG. 18 below.

In one embodiment, the portion 100 includes one or more fastening straps 105,106,107,108 extending from the sides of the leg engaging section 101, the foot engaging section, or combinations thereof. For example, in the illustrative embodiment of FIGS. 1 and 2, the portion 100 has four fastening straps 105,106,107,108 extending from its sides. At least one fastening strap 105 extends from a first side of the portion 100, while others extend from another side of the portion 100. This allows the fastening straps to "criss-cross" from one side of the portion 100 to the other. In this illustrative embodiment, two fastening straps 105,106 extend from the foot engaging section 102, while two other fastening straps 107,108 extend from the leg engaging section 101. Also, in this illustrative embodiment, three fastening straps 106,107,108 extend from the medial side 109 of the portion 100, while one fastening strap 105 extends from the lateral side 110 of the portion 100. This configuration is illustrative only, as other configurations and placements of the fastening straps 105,106,107,108 will be obvious to those of ordinary skill in the art having the benefit of this disclosure.

In one embodiment, the fastening straps 105,106,107,108 are stretchable. For example, they may comprise an elasticized material configured to stretch when being wrapped about the leg insertion aperture 104. In another embodiment, the fastening straps 105,106,107,108 are not stretchable, but are rather material layers that are fixed in length and do not change when being wrapped about the leg insertion aperture 104. The fastening straps 105,106,107,108 are affixed to the portion 100 by stitching in one embodiment. FIG. 2 illustrates fastening straps 107,108 being attached to the leg engaging section 101 along seam 202.

In one embodiment, each of the fastening straps 105,106,107,108 comprises one of a hook fastener or a loop fastener disposed therealong. Illustrating by example, fastening strap 105 may have hook fasteners disposed along side 111. To complete the fastening system, in one embodiment the leg engaging section 101 includes one or more panels 112,113 that have a complementary fastener disposed therealong. Where, for example, fastening strap 105 includes hook fasteners, corresponding panel 112 may have loop fasteners disposed therealong, as the loop fasteners are complementary to the hook fasteners. Accordingly, when fastening strap 105 is wrapped across the leg insertion aperture 104, it can be attached anywhere along panel 112. The same is true with fastening straps 106,107,108 attaching to panel 113. While hook and loop fasteners are one type of fastener or attachment mechanism suitable for use with embodiments of the disclosure, it should be noted that others will be obvious to those having ordinary skill in the art and the benefit of this disclosure. For example, the hook and loop fasteners can be replaced by laces, snaps, buttons, drawstrings, or other fastening devices.

In one embodiment, the interior lining 114 of the central portion 121 of the leg engaging section 101 is soft and comfortable. For example, in one embodiment the interior lining 114 can be fleece or another soft material. In another embodiment, the interior lining 114 can be felt or chamois. As will be described below, in one or more embodiments the interior lining 114 can include an optional pocket (1205) into which an inflatable bladder may be inserted. In other embodiments the central portion 121 of the leg engaging section 101 includes an inflatable bladder disposed beneath the interior lining 114.

In one embodiment, the interior lining 114 has a relatively high coefficient of friction so that the portion 100 does not move when wrapped about a patient's limb or compression device attached thereto. For example, the interior lining 114 can be brushed, napped or sanded to raise its pile for comfort and increase the coefficient of friction. In one embodiment, the interior lining 114 has an antibacterial, antimicrobial, or anti-odor material integrated therein to help reduce the risk of bacteria, microbes, or odors from existing in the interior of the portion 100 after prolonged use. The interior lining 114 can also be manufactured from a wicking material. The exterior 116 of the portion 100 may be water resistant or waterproof as desired. In one embodiment, the interior of the portion 100 can be constructed from a cooling material, such as a gel that can be cooled to apply thermal therapy to the patient.

As shown in FIG. 2, in one embodiment the leg engaging section 101 defines at least one aperture 203,204 disposed in an ankle region of the leg engaging section 101. Various configurations of the aperture 203,204 will be described in more detail below with reference to FIGS. 13 and 14. As will also be described below, at least one aperture 203,204 advantageously allows connection tubes to exit the portion at non-orthogonal angles to reduce the possibility of pressure points arising under the patient's limb. Where a connection tube extends from the inflatable bladder, the inclusion of apertures 203,204 helps to minimize the risk of the connection tube contacting a patient's skin by providing an easy and convenient exit port. The addition of the apertures 203,204 on the lateral side 110 and medial side 109 of the leg engaging section 101 allows the connection tube emanating from the compression device to run directly out of the portion 100, thereby eliminating the need to "tuck" tubing into the seam of the boot and away from the skin. In one embodiment, one aperture 203 is disposed about forty-five degrees around the leg engaging section 101 from the other aperture 204.

In one embodiment the aperture 204 can be configured as a channel to permit a connection tube extending from an inflatable bladder of a compression device to pass therethrough. The channel can optionally be reinforced about its perimeter. The channel can be disposed in-line with a seam of the portion 100 or can be proximally located with the seam.

Figure 3:
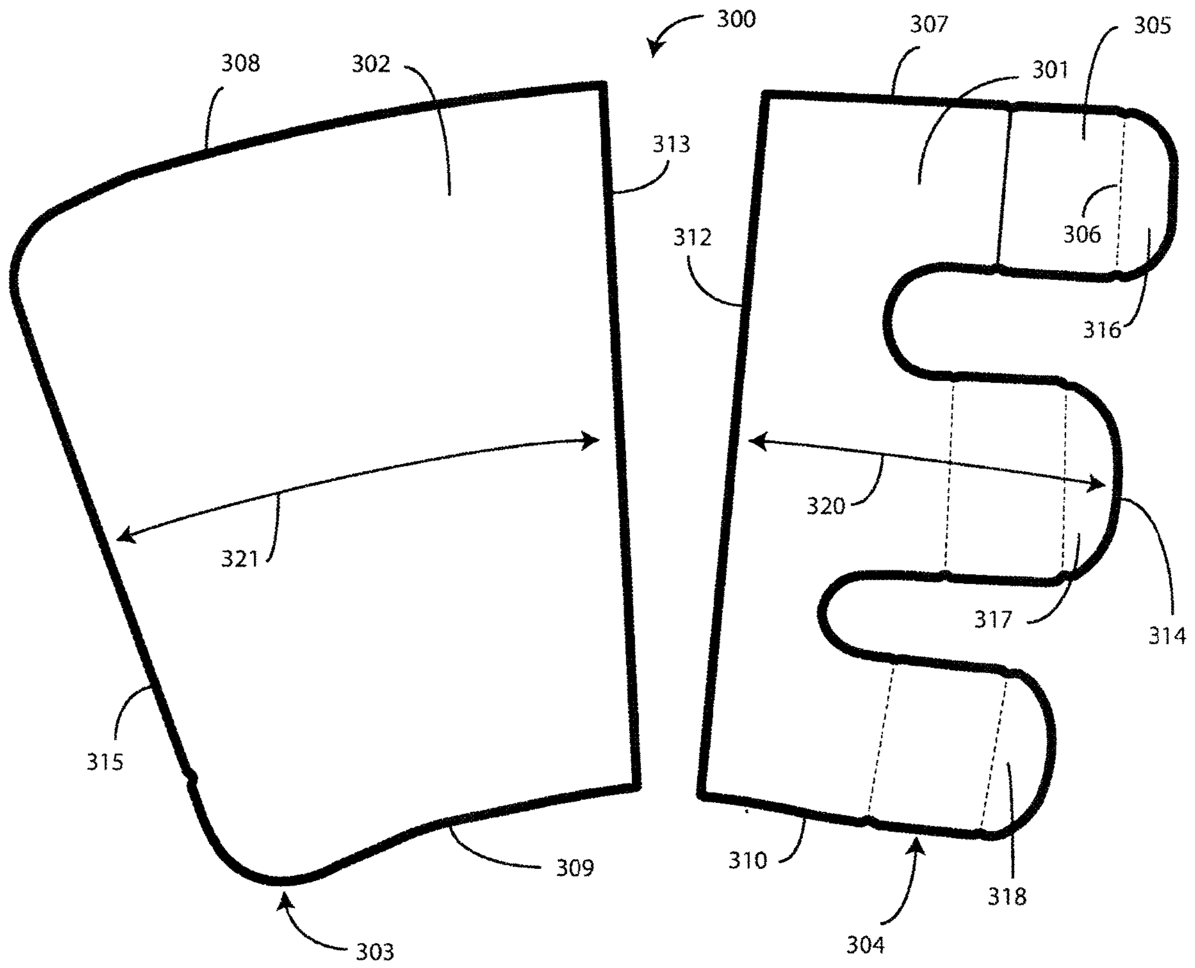
FIG. 3 illustrates another explanatory portion of a device in accordance with one or more embodiments of the disclosure.

Turning now to FIG. 3, illustrated therein are additional portions 300 of one or more devices configured in accordance with one or more embodiments of the disclosure. The portions 300 shown in FIG. 3 are to attach to the portion (100) shown in FIG. 1 to create the overall device. While the portion (100) of FIG. 1 is to provide cushioning support for a patient's limb, the portions 300 of FIG. 3 can be included in the device to provide compression therapy.

The portions of FIG. 3 include a first compression wrap member 301 and a second compression wrap member 302. The first compression wrap member 301 and the second compression wrap member 302 are configured to attach to the portion (100) of FIG. 1 so as to wrap about the leg or other limb of a patient. While a leg is used as an explanatory limb for the purposes of discussion, those of ordinary skill in the art having the benefit of this disclosure will appreciate that the first compression wrap member 301 and the second compression wrap member 302 could equally be configured as an arm cuff, a knee sleeve, or sleeve for another body part.

In one embodiment, the first compression wrap member 301 and the second compression wrap member 302 are manufactured from a non-stretchable material. In other embodiments, the first compression wrap member 301 and the second compression wrap member 302 are manufactured from a stretchable, elasticized material. The first compression wrap member 301 and the second compression wrap member 302 can comprise one or more layers of material that are stitched together. For example, in one embodiment, the first compression wrap member 301 and the second compression wrap member 302 each comprise at least two layers of material that are stitched together along a perimeter 303,304. Panels, e.g., tab panel 305, can also be defined by stitching 306 as well. The stitching 306 can be replaced by other suitable means for joining the materials, such as high frequency welds, ultrasonic welding, thermal bonding, heat-sealing, or adhesive bonding.

One example of a suitable material for the first compression wrap member 301 and the second compression wrap member 302 is nylon tricot. Nylon tricot is manufactured by machines that use a warp-knit pattern to weave nylon fiber. The fibers are typically woven across the width of the material layer in a zigzag pattern. The nylon tricot can be 100% nylon fiber, or can alternatively be a blend of nylon and other fibers, including rayon or cotton. Nylon tricot works well as the first compression wrap member 301 and the second compression wrap member 302 because it does not snag or run easily. Moreover, it can be manufactured in a variety of colors. Nylon tricot can also be machine-washed.

Other materials can be used as the first compression wrap member 301 and the second compression wrap member 302 as well. For instance, the first compression wrap member 301 and the second compression wrap member 302 can be manufactured from one or more sheets of plastic, neoprene, rubber, foam, felt, polymers, resins, and/or natural fabric materials. In some embodiments, only some layers of the first compression wrap member 301 and the second compression wrap member 302 can be configured to be stretchy and elastic. For instance, the outer face of the first compression wrap member 301 and the second compression wrap member 302 can be manufactured from a stretchy material, such as tricot stretch fabric, while an inner face of the first compression wrap member 301 and the second compression wrap member 302 is manufactured from a non-elastic material, or vice versa. Additionally, the various layers of first compression wrap member 301 and the second compression wrap member 302 may be manufactured from materials having varying degrees of elasticity or stretchiness.

In the illustrative embodiment of FIG. 3, the first compression wrap member 301 and the second compression wrap member 302 and each corresponding outer face define a proximal edge 307,308, a distal edge 309,310, a first side edge 312,313, and a second side edge 314,315. In this embodiment, the second side edge 314 of the first compression wrap member 301 defines a plurality of attachment tabs 316,317,318. In one embodiment, the attachment tabs 316, 317,318 attach to the outer face of the second compression wrap member 302. In one embodiment the attachment tabs 316,317,318 employ hook and loop fastening devices for attachment. For example, each of the attachment tabs 316, 317,318 can include hook fasteners disposed on the inner face, while the outer face of the second compression wrap member 302 comprises loop pile fabric to which the hook fasteners can attach. It will be obvious to those of ordinary skill in the art having the benefit of this disclosure that other attachment mechanisms can be used, such as zippers, buttons, straps, laces, adhesive, or other devices.

In one or more embodiments, the first side edge 312,313 and the second side edge 314,315 are not parallel. This is due to the fact that a medial reference line 320,321 extending across each of the first compression wrap member 301 and the second compression wrap member 302 has a curvature configured to facilitate the first compression wrap member 301 and the second compression wrap member 302 wrapping around a patient's limb. This curvature causes both the first side edge 312,313 and second side edge 314,315 to be oblique relative to each other so as to be substantially orthogonal with the medial reference line 320,321. Accordingly, the longitudinal boundaries of the second side edges 314,315 form a quasi-frustoconical shape ("quasi" because the top and bottom are curved in accordance with the curvature).

Figure 4:
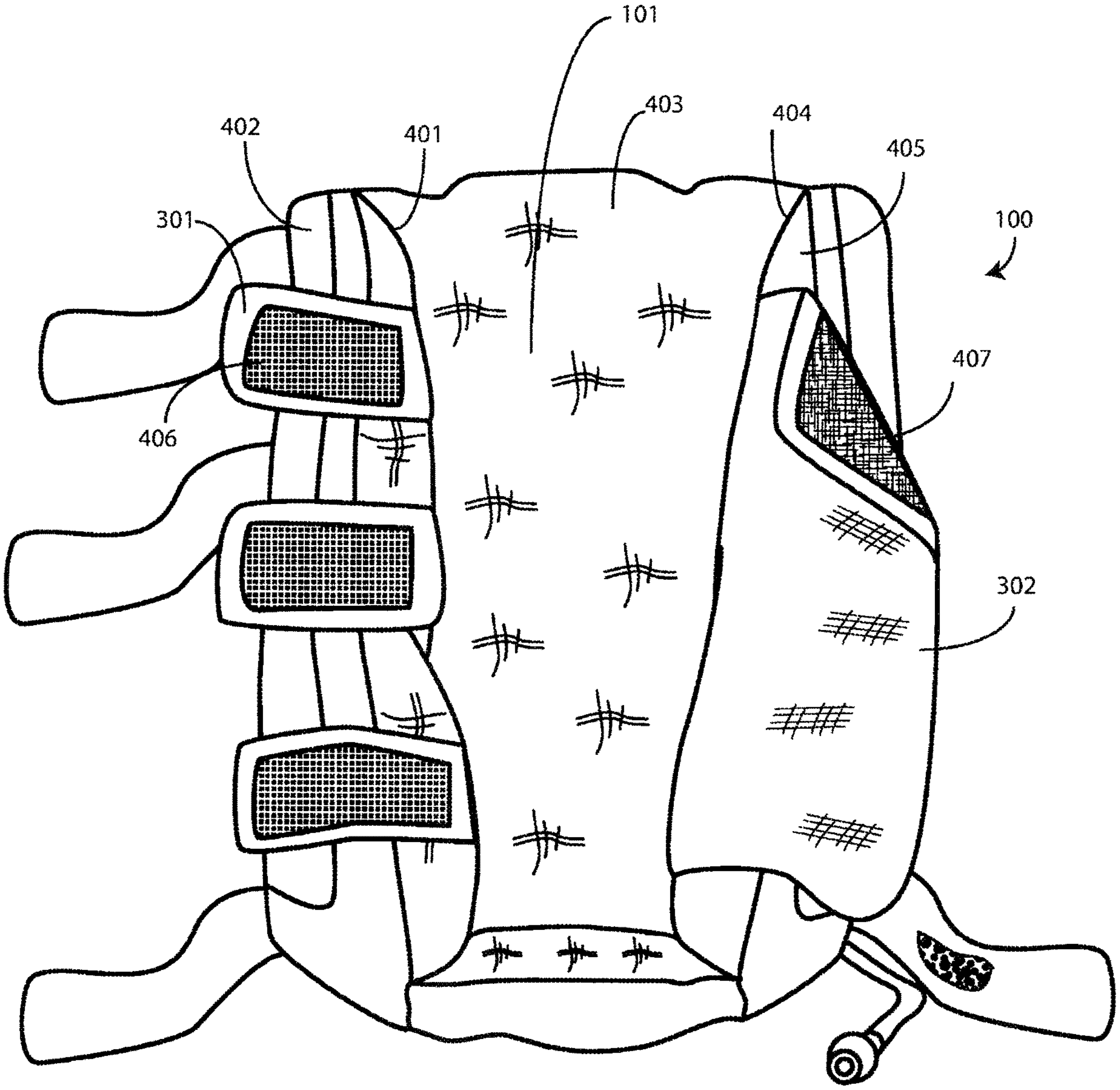
FIG. 4 illustrates an explanatory device in accordance with one or more embodiments of the disclosure.

Turning now to FIG. 4, illustrated therein is the first compression wrap member 301 and the second compression wrap member 302 coupled to the portion 100 of FIG. 1. In this embodiment, the first compression wrap member 301 and the second compression wrap member 302 are coupled interior to the portion 100. The first side (312) of the first compression wrap member is coupled to a seam 401 of the portion 100 between a first side 402 of the portion 100 and a central panel 403 of the portion 100. Similarly, the first side (303) of the second compression wrap member 302 is coupled to a seam 404 of the portion 100 between a second side 405 of the portion and the central panel 403 of the portion 100. This results in the first compression wrap member 301 and the second compression wrap member 302 being disposed interior to the first side 402 and the second side 405 of the leg engaging section 101 of the portion 100 in this illustrative embodiment. The first compression wrap member 301 and the second compression wrap member 302 are configured as compression straps extending form the central panel 403 interior to the first side 402 and the second side 405 in this illustrative embodiment.

As shown, a hook fastener 406 is disposed along an interior side of the first compression wrap member 301. A loop fastener 407 is disposed along an exterior side of the second compression wrap member 302. The hook fastener 406 can couple to the loop fastener 407 when the first compression wrap member 301 and the second compression wrap member 302 are wrapped around a patient's limb.

Turning now to FIGS. 5-8, illustrated therein are different configurations for the central panel 403 of the portion (100) in accordance with one or more embodiments of the disclosure. Each view illustrates components of the assembly of FIG. 4 that are not generally visible from the assembly's exterior.

Figure 5:
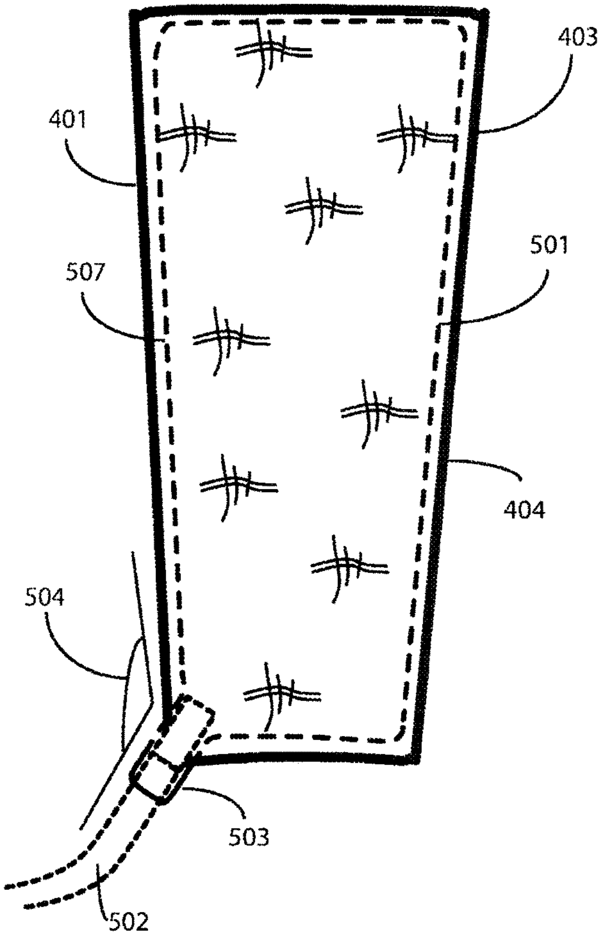
FIG. 5 illustrates another explanatory portion of a device in accordance with one or more embodiments of the disclosure.

Beginning with FIG. 5, in one embodiment the central panel 403 of the portion (100) includes an inflatable bladder 501 that is configured to be selectively inflatable or deflatable. In one embodiment, the inflatable bladder 501 is disposed beneath the fabric of the central panel 403. In another embodiment, the inflatable bladder 501 is disposed within a pocket (1205) of the central panel 403. In the illustrative embodiment of FIG. 5, the former is the case, as the inflatable bladder 501 is disposed between seam 401 and seam 404. In one embodiment, seam 401 and seam 404 define the inflatable bladder 501. In another embodiment, the inflatable bladder 501 is a separate component that is held in place between seam 401 and seam 404. While the central panel 403 is one suitable location for the inflatable bladder 501, it is illustrative only. Other locations will be obvious to those of ordinary skill in the art having the benefit of this disclosure. Disposing the inflatable bladder 501 along the central panel 403 allows the inflatable bladder 501 to be positioned beneath the calf muscle of a patient who is lying upon their back.

Figure 7:
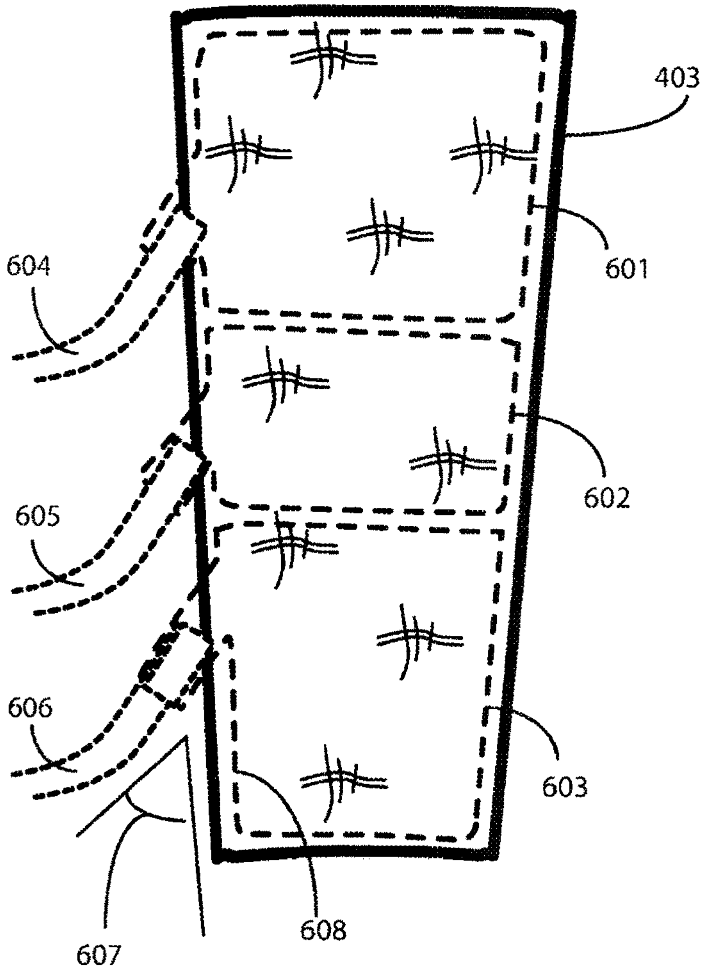
FIG. 7 illustrates another explanatory portion of a device in accordance with one or more embodiments of the disclosure.

While the inflatable bladder 501 is shown illustratively in FIG. 5 as being a single chamber bladder with no internal welds or chambers, it should be understood that the inflatable bladder 501 may also be constructed as a multichamber bladder as well. Turning briefly to FIG. 7, illustrated therein is an alternate central panel 403 that includes multiple inflatable bladders 601,602,603. A first inflatable bladder 601 is selectively inflatable through a connection tube 604 exiting the inflatable bladder 601 at a non-orthogonal angle, while an additional inflatable bladder 602 is also selectively inflatable through an additional connection tube 605 exiting the additional inflatable bladder 602 at another non-orthogonal angle.

In one or more embodiments, the inflatable bladders 601,602,603 are selectively inflatable. Said differently, the first inflatable bladder 601 can be inflated at a first time while the additional inflatable bladder 602 can be inflated at another time, and so forth. It is contemplated that in some situations therapy may be improved by inflating the inflatable bladders 601,602 603 at different times. To provide this functionality, multiple connection tubes 604,605,606 extend from each inflatable bladder 601,602,603 for connection to a pump. In the illustrative embodiment of FIG. 7, each connection tube 604,605,606 extends down and away from the corresponding inflatable bladder 601,602,603, i.e., at a non-orthogonal angle 607 relative to an edge 608 of the inflatable bladder 603, so as to extend toward the foot engaging section (102) of the assembly of FIG. 4 for connection to a pump. A secondary function of this down and away orientation of the connection tubes 604,605,606 is stabilization, as this angular configuration helps to prevent devices in accordance with one or more embodiments from rolling.

Turning now back to FIG. 5, in one embodiment the inflatable bladder 501 is selectively inflatable through a connection tube 502. For example, in one application the inflatable bladder 501 can be inflated with air to a pressure of forty millimeters of mercury to apply pressure to a patient's limb for compression therapy. The connection tube 502 is coupled to the inflatable bladder 501 by way of a connector 503.

Figure 6:
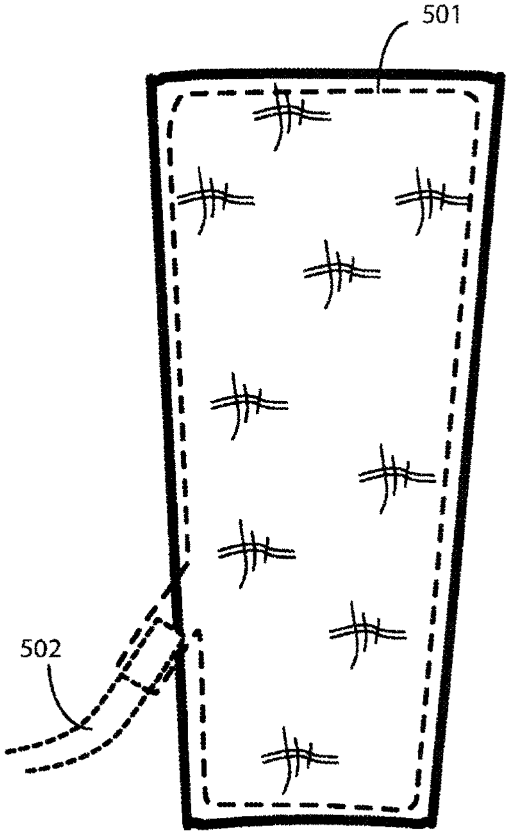
FIG. 6 illustrates another explanatory portion of a device in accordance with one or more embodiments of the disclosure.

In one embodiment, to provide a more comfortable user experience, the connector 503 and connection tube 502 exit the inflatable bladder 501 at a non-orthogonal angle 504 relative to the edge 507 of the inflatable bladder 501. For example, in one embodiment the non-orthogonal angle 504 is about 120 degrees. When the central panel 403 is disposed beneath the patient's leg, for instance, the non-orthogonal angle 504 ensures that the connection tube 402 does not run parallel to the patient's leg, thereby causing discomfort that occurs when the connection tube passes along the patient's Achilles tendon. The non-orthogonal angle 504 causes the connection tube 502 to naturally curve away from the patient's leg, thereby increasing the patient's comfort when using the devices in accordance with embodiments of the disclosure. While 120 degrees is one example of a suitable non-orthogonal angle, others will be obvious to those of ordinary skill in the art having the benefit of this disclosure. As shown in FIG. 6, the connection tube 502 can exit the inflatable bladder 501 at different locations so as to further increase the comfort of the patient.

In one or more embodiments, the inflatable bladder 501 may be made of think elastic material so that it expands and contracts with the introduction of cycling air. The shape of the inflatable bladder 501 may be square or trapezoidal. Alternatively, it may be configured as other patient limb-conforming shapes. The connector 503 may be an extension of the bladder material, which narrows as it extends from the main bladder portion in one or more embodiments. This configuration locates the connection tube 502, which may be rigid, as far away from the patient's limb as possible.

Figure 8:
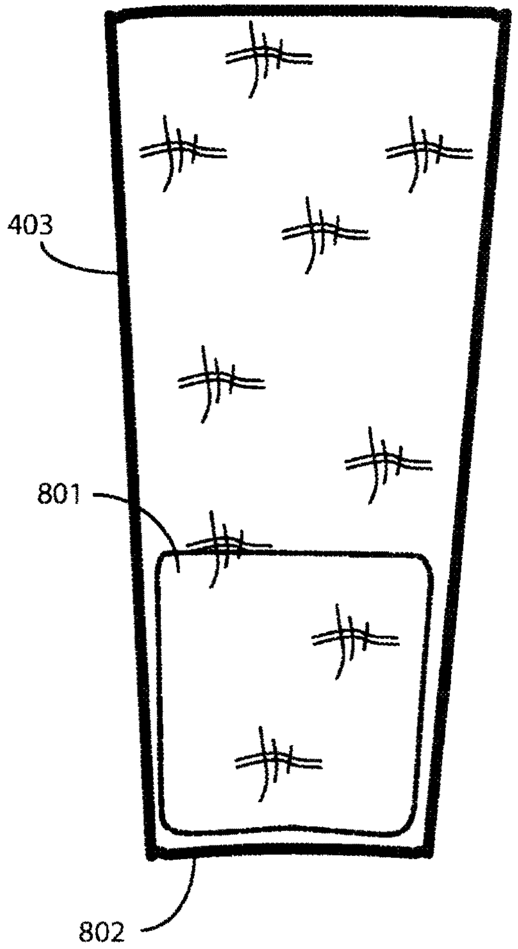
FIG. 8 illustrates another explanatory portion of a device in accordance with one or more embodiments of the disclosure.

Turning now to FIG. 8, illustrated therein is another embodiment of the central panel 403. As shown in FIG. 8, one embodiment of the central panel 403 comprises a foam layer 801. The foam layer 801 serves as a cushion and may be disposed at different locations along the central panel 403. In the illustrative embodiment of FIG. 8, the foam layer 801 is disposed adjacent to the bottom edge 802 of the central panel 403. In one embodiment, the foam layer 801 extends distally from the bottom edge 802 across only a portion of the central panel 403. In one or more embodiments, the foam layer 801 can be configured to cover the connector (503) of the inflatable bladder (501) to slightly elevate the patient's heel when devices configured in accordance with embodiments of the disclosure are in use. This elevation helps to ensure that the connector (503) of the inflatable bladder (501) does not become a pressure point against the patient's leg.

In one or more embodiments, the foam layer 801 and one or more inflatable bladders (501,601,602,603) can be used in combination. In one embodiment, the foam layer 801 is disposed between the one or more inflatable bladders (501, 601,602,603) and the patient's limb. In another embodiment, the one or more inflatable bladders (501,601,602,603) are disposed between the patient's limb and the foam layer 801. Thus, assemblies shown in FIGS. 5-7 and the assembly shown in FIG. 8 can be used in combination.

Figure 9:
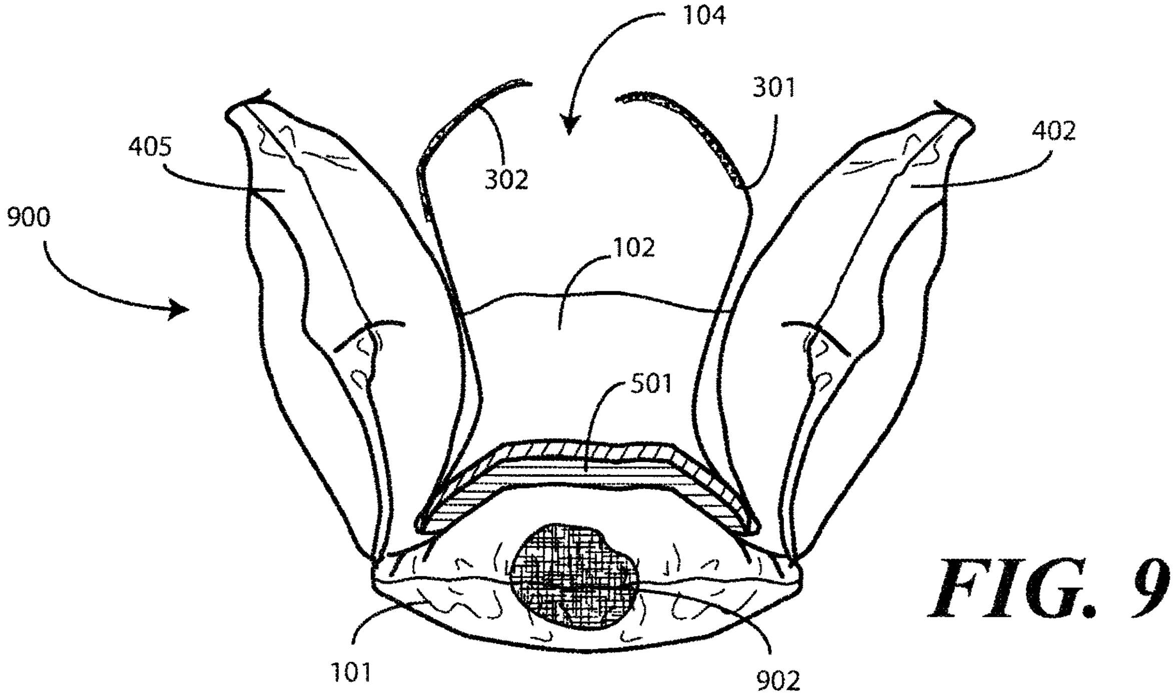
FIG. 9 illustrates one explanatory device in accordance with one or more embodiments of the disclosure.
Figure 10:
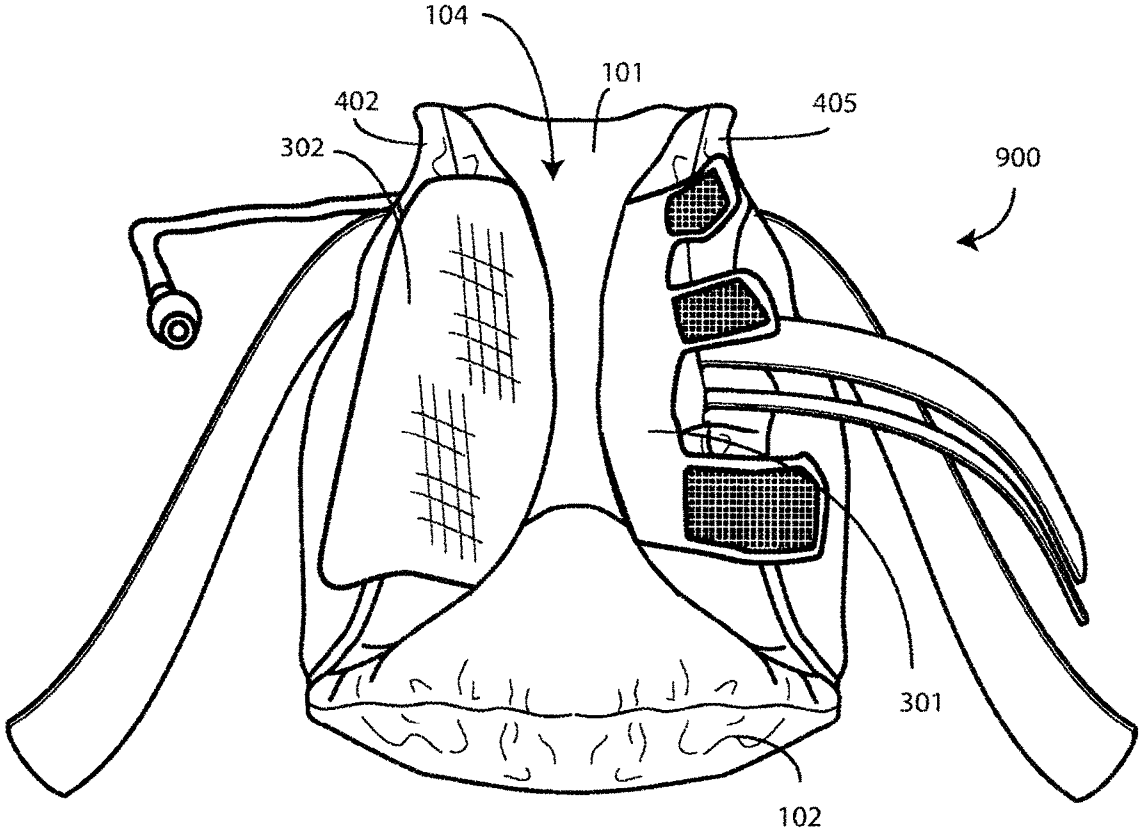
FIG. 10 illustrates one explanatory device in accordance with one or more embodiments of the disclosure.

Turning now to FIGS. 9 and 10, illustrated therein is a device 900 configured in accordance with one or more embodiments of the disclosure. The device 900 is shown in FIG. 9 sectional view so that internal and external components can be seen. The device 900 is shown in an open view in FIG. 10.

In this illustrative embodiment, the device 900 includes a leg engaging section 101 and a foot engaging section 102 intersecting at a heel receiver. The leg engaging section 101 and the foot engaging section 102 define a leg insertion aperture 104. At least the leg engaging section includes a compressible cushion layer 902. The compressible cushion layer 902 can be manufactured from one of an organic batting or an inorganic batting, or alternatively of combinations thereof.

The device 900 includes the first compression wrap member 301 and the second compression wrap member 302. In this embodiment, the first compression wrap member 301 and the second compression wrap member 302 extend from the leg engaging section 101. Here, the the first compression wrap member 301 and the second compression wrap member 302 are disposed interior of a first side 402 and a second side 405 of the leg engaging section 101.

The device 900 includes an inflatable bladder 501 disposed along the leg engaging section 101 between the leg insertion aperture 104 and the compressible cushion layer 902. As noted above, in one or more embodiments the inflatable bladder 501 is selectively inflatable through a connection tube 502 exiting the inflatable bladder 501 at a non-orthogonal angle (504) relative to an edge (507) of the inflatable bladder 501.

As best seen in FIG. 10, in one embodiment the leg engaging section 101 defines at least one channel to permit the connection tube 502 to exit the device 900. The port of the inflatable bladder 501 can be routed though the channel in the device 900 and angled away from a patient's limb so that it does not induce pressure on the limb. The channel works to immobilize the connection tube 502, thereby keeping it from the interior region into which a patient's limb is placed. The channel also prevents the connection tube 502 from moving or wandering internally within the device. The non-orthogonal angle (504) of exit allows for the connection tube 502 to selectively pivot as a patient's limb rests in the device 900. Moreover, it allows the connection tube 502 to articulate with limb movement. The channel works to ensure that the connection tube 502 maintains its position relative to a patient's limb even when the patient moves around in one or more embodiments.

Figure 11:
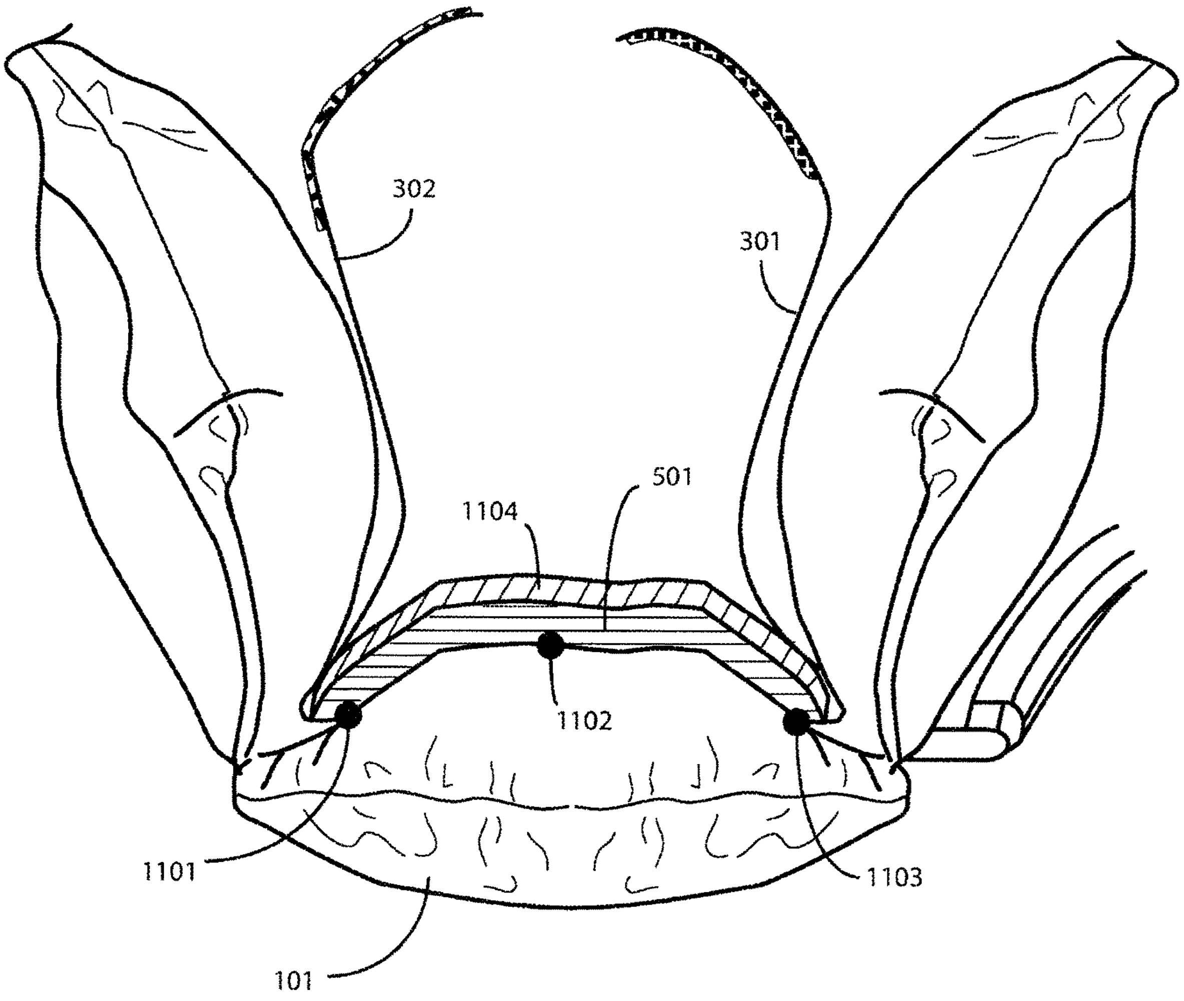
FIG. 11 illustrates one explanatory device in accordance with one or more embodiments of the disclosure.

Turning now to FIG. 11, illustrated therein are potential attachment points 1101,1102,1103 for first compression wrap member 301 and the second compression wrap member 302. In one embodiment, the first compression wrap member 301 can be attached to the leg engaging section 101 at a first attachment point 1101. For example, the first compression wrap member 301 can be sewn or otherwise attached to the leg engaging section 101 at the first attachment point 1101. Similarly, the second compression wrap member 302 can be sewn or otherwise attached to the leg engaging section 101 at attachment point 1103.

In one embodiment, the first compression wrap member 301 and the second compression wrap member 302 are attached to each other or are formed from a single piece of material that is sewn or otherwise attached to the leg engaging section at attachment point 1102. Connecting the first compression wrap member 301 and the second compression wrap member 302 only at attachment point 1102 allows the first compression wrap member 301 and the second compression wrap member 302 to more tightly wrap about a patient's limb. Further, a seam disposed at attachment point 1102 does not present a pressure ulcer pressure point as it is covered by the inflatable bladder 501 and optionally additional padding 1104.

In one or more embodiments, the first compression wrap member 301 and the second compression wrap member 302 can be attached to the leg engaging section 101 at combinations of the attachment points 1101,1102,1103. Additionally, other attachment points will be obvious to those of ordinary skill in the art having the benefit of this disclosure.

Figure 12:
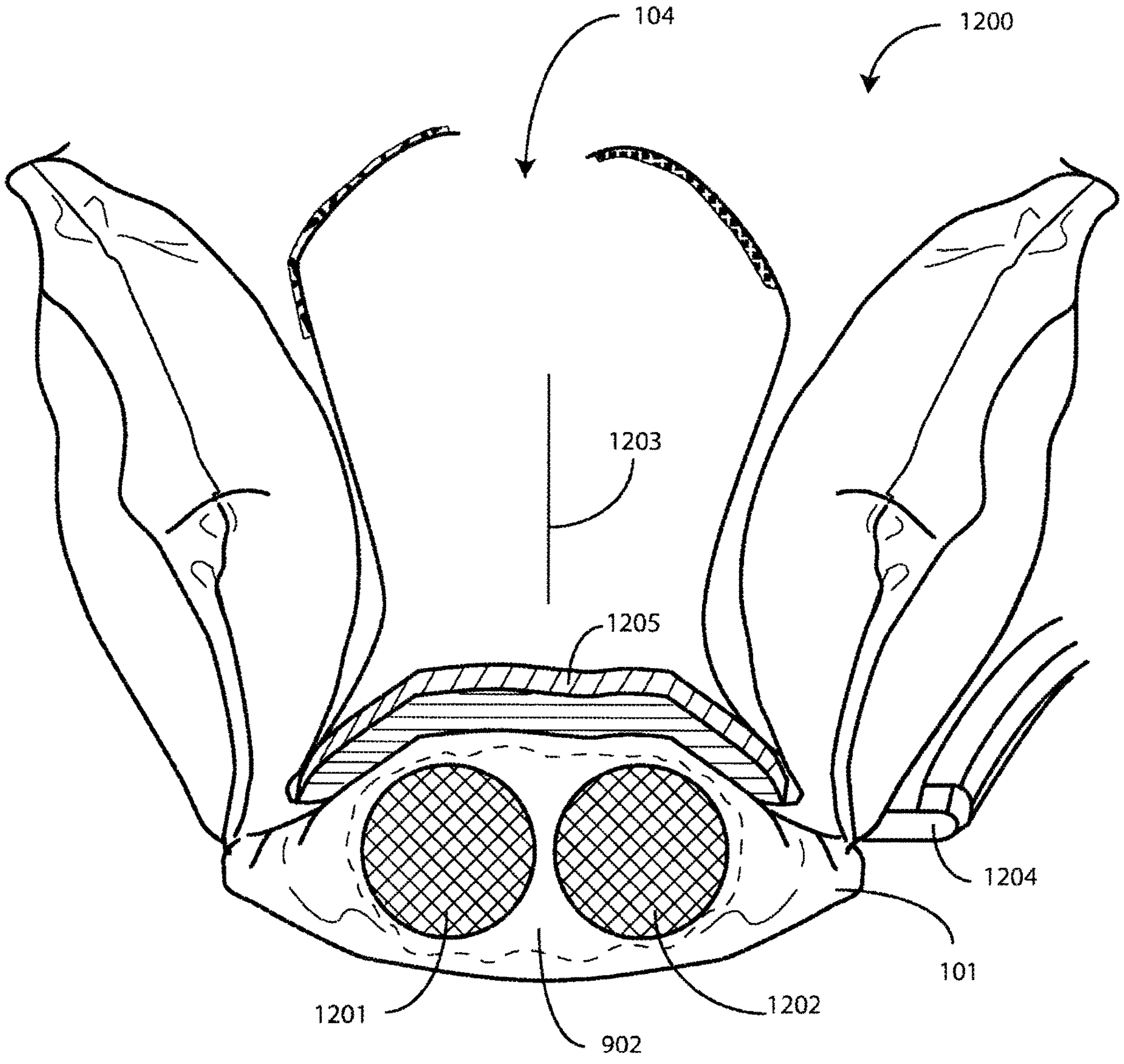
FIG. 12 illustrates one explanatory device in accordance with one or more embodiments of the disclosure.

Turning now to FIG. 12, illustrated therein is an alternate device 1200 configured in accordance with one or more embodiments of the disclosure. To provide additional lateral stability, the device 1200 of FIG. 12 includes two foam or air-filled tubes 1201,1202 disposed within the leg engaging section 101. The compressible cushion layer 902 surrounds the first tube 1201 and the second tube 1202 in this embodiment. As noted above, the compressible cushion layer 902 can comprise one of an organic batting, an inorganic batting, or combinations thereof.

In this illustrative embodiment, the first tube 1201 disposed to a first side of a medial line 1203 of the leg engaging section 101, while the second tube 1202 is disposed to a second side of the medial line 1203. When a patient's limb is inserted into the leg insertion aperture 104, placement of the limb on the leg engaging section 101 causes the first tube 1201 and the second tube 1202 to spread to either side of the patient's limb, thereby increasing stability.

Figure 13:
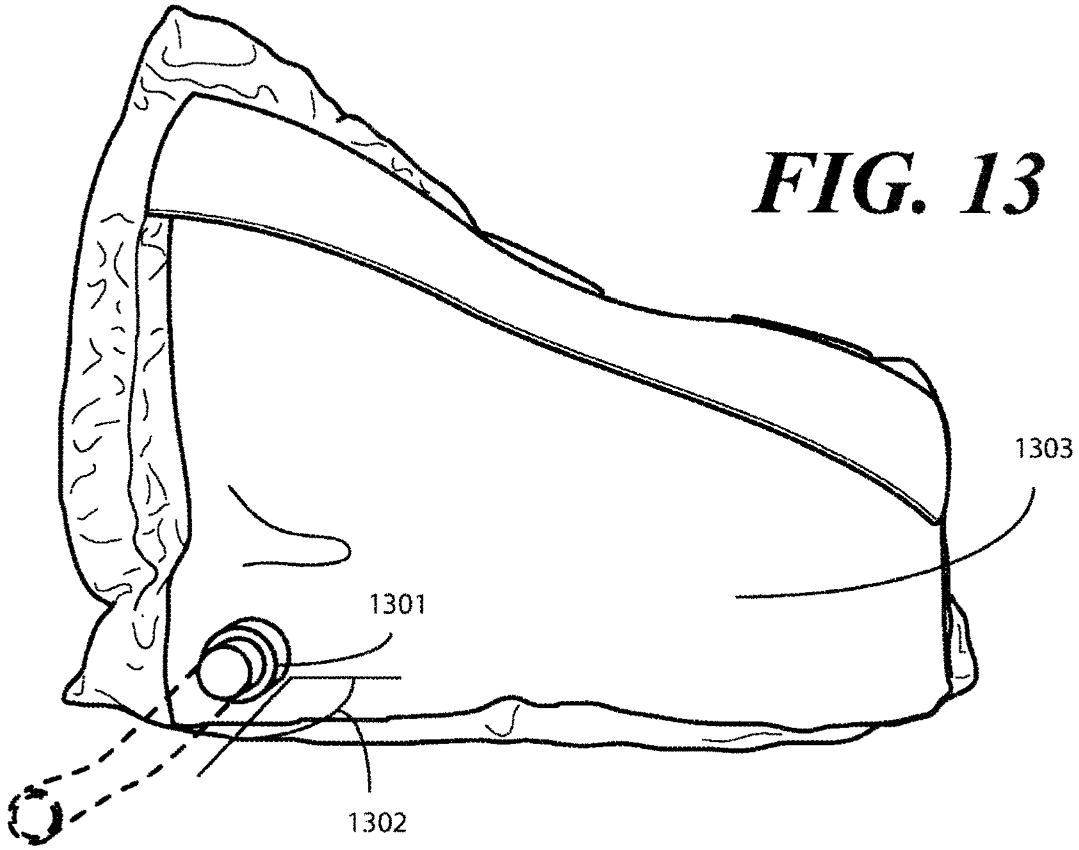
FIG. 13 illustrates one explanatory device in accordance with one or more embodiments of the disclosure.

Turning now to FIGS. 13-16, illustrated therein are different connection tubing configurations in accordance with embodiments of the disclosure. Beginning with FIG. 13, illustrated therein is an exterior view of the device 900 of FIG. 9. As shown, the device 900 includes a port 1301 extending from the channel of the device 900. In one embodiment, the port 1301 extends from the channel at an angle 1302 relative to a side 1303 of the device 900. The angle 1302 can match the angle (504) at which the connection tube (502) exits the inflatable bladder (501) in one or more embodiments.

Figure 14:
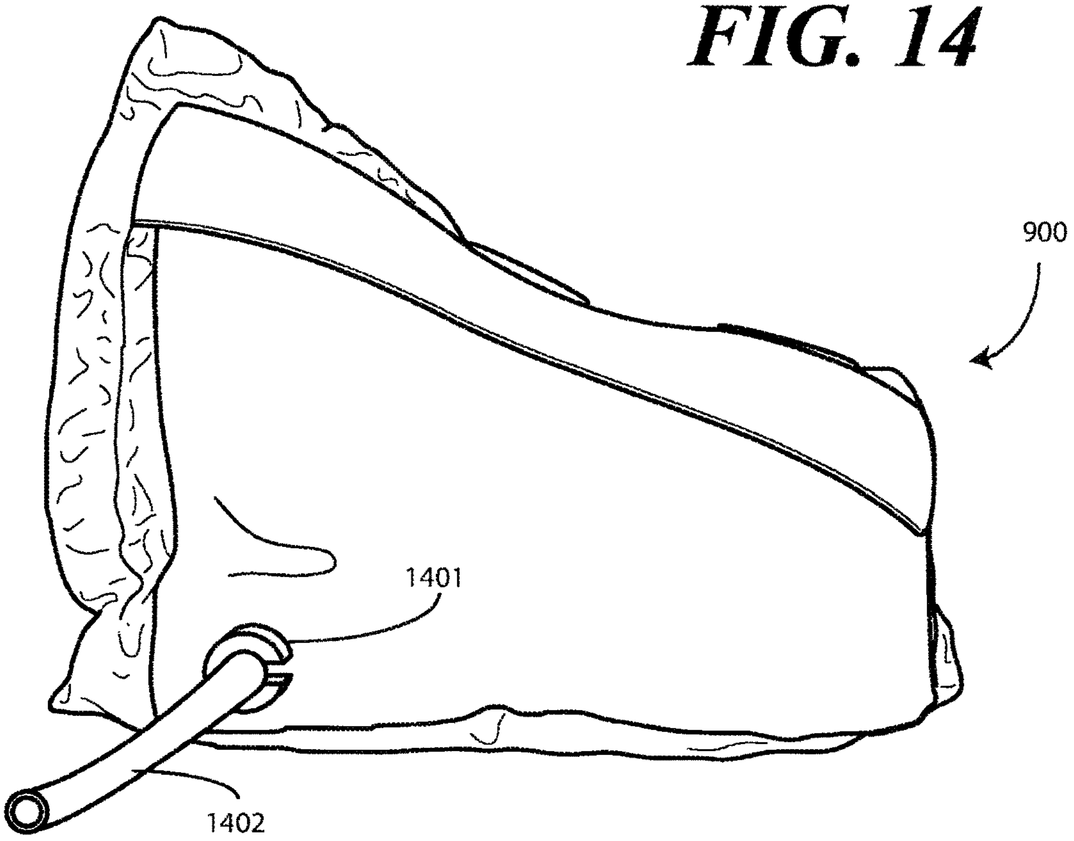
FIG. 14 illustrates one explanatory device in accordance with one or more embodiments of the disclosure.

As shown in FIG. 14, in one embodiment, a strain relief fitting 1401 can be disposed about the connection tube 1402 at an exterior of the device 900. In one embodiment the strain relief fitting 1401 is disposed on the outside surface of the device to prevent the connection tube 1402 from sliding into channel, thereby forcing the connection tube (502) exiting the inflatable bladder (501) from translating into the interior of the leg insertion aperture. The strain relief fitting 1401 may also further direct the connection tube 1402, which may simply be an extension of connection tube (502), towards the back of the device or at least towards the position of the pump which is typically at the foot of the bed in a hospital environment. The strain relief fitting 1401 may incorporate or be coupled to a right angle elbow connector (shown as element (1204) in FIG. 12) that further connect to tubing that extends to the pump.

Figure 15:
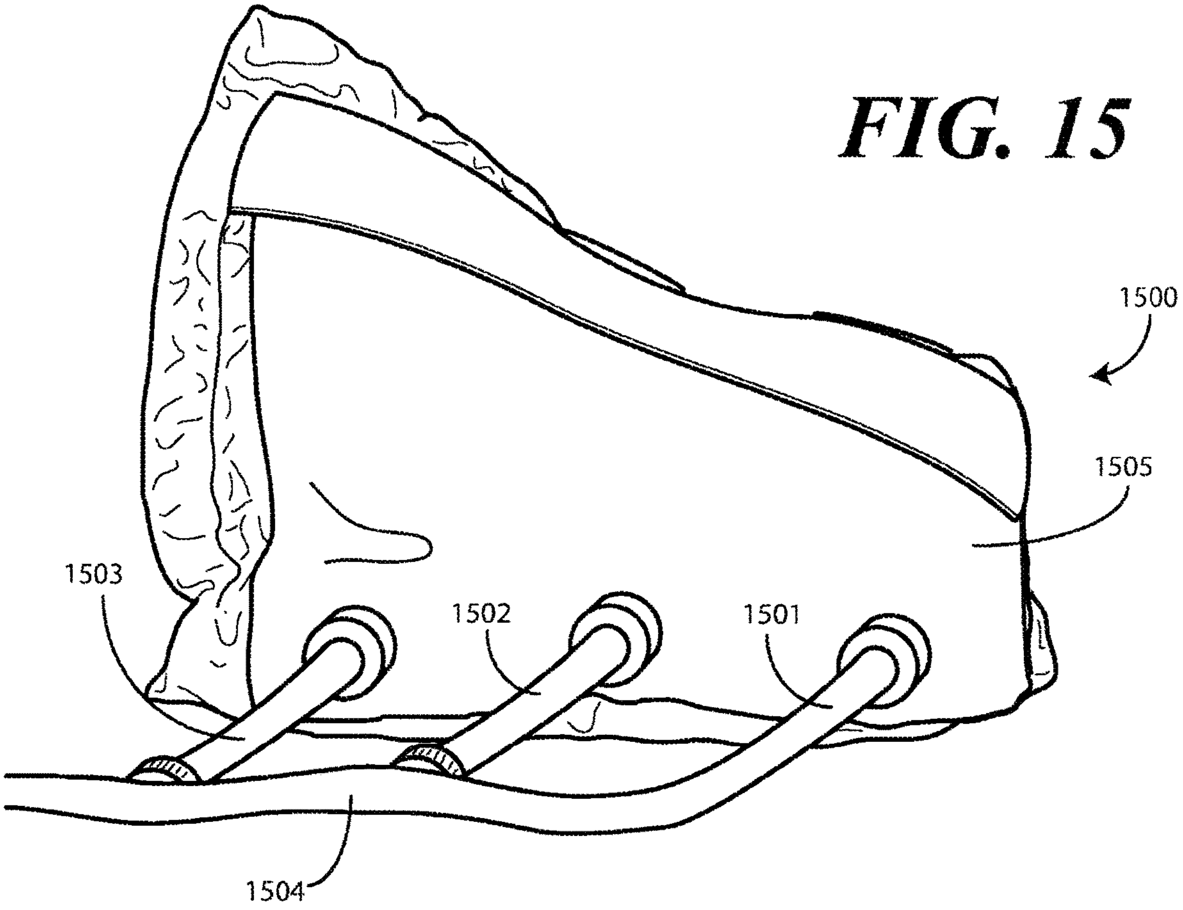
FIG. 15 illustrates one explanatory device in accordance with one or more embodiments of the disclosure.
Figure 16:
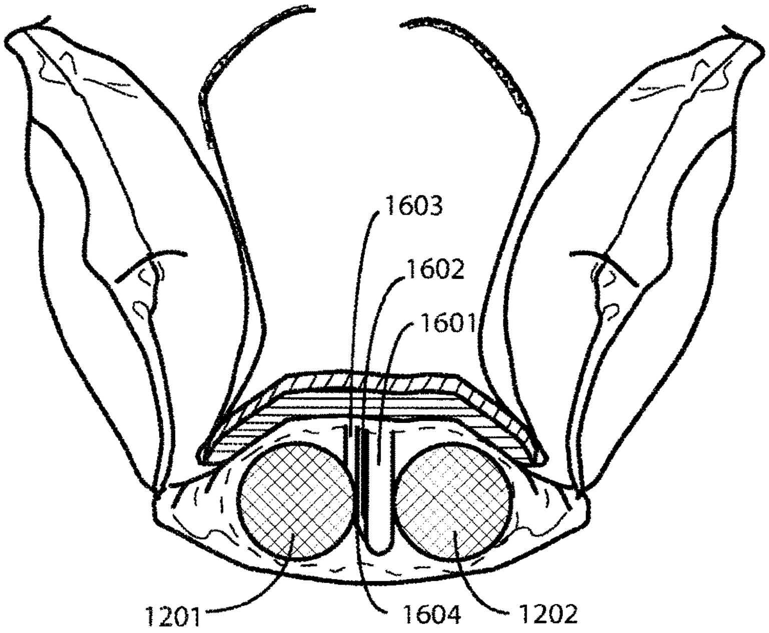
FIG. 16 illustrates one explanatory device in accordance with one or more embodiments of the disclosure.
Figure 17:
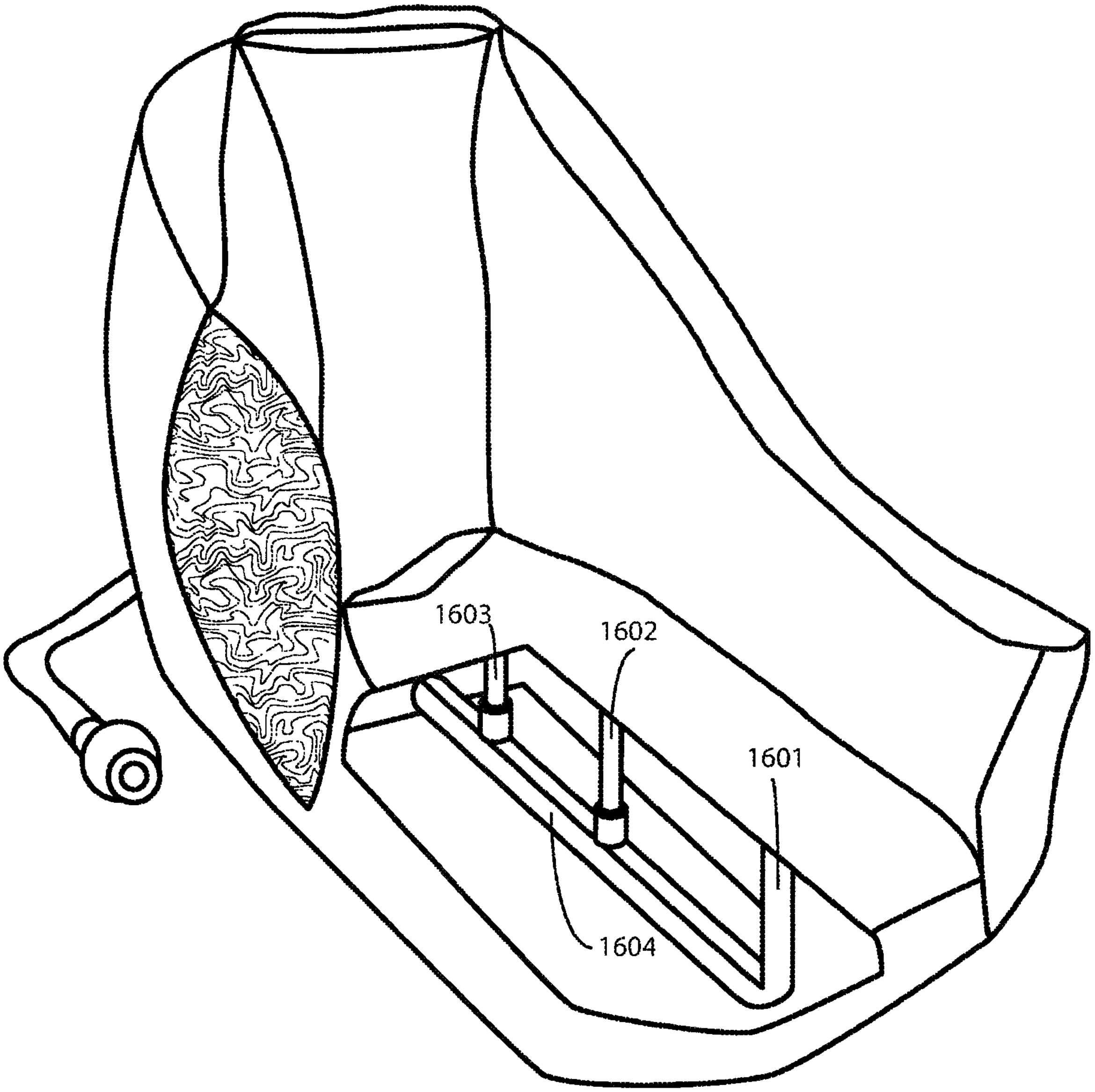
FIG. 17 illustrates one explanatory device in accordance with one or more embodiments of the disclosure.

Turning now to FIG. 15, this device 1500 includes multiple inflatable bladders. Accordingly, multiple connection tubes 1501,1502,1503 exit the device 1500 due to the fact that the leg engaging section 1505 defines at least one additional channel to permit the at least one additional connection tube 1502,1503 to exit the device 1500. In this illustrative embodiment, the connection tubes 1501,1502, 1503 are coupled to a common tube 1504 exterior to the device 1500. The common tube 1504 can then be connected to a pump. By contrast, in FIGS. 16-17, the connection tubes 1601,1602,1603 are coupled to a common tube 1604 interior to the device 1600. Tubes 1201,1202 are included to ensure that this interior connection does not cause pressure on the patient's leg.

Figure 18:
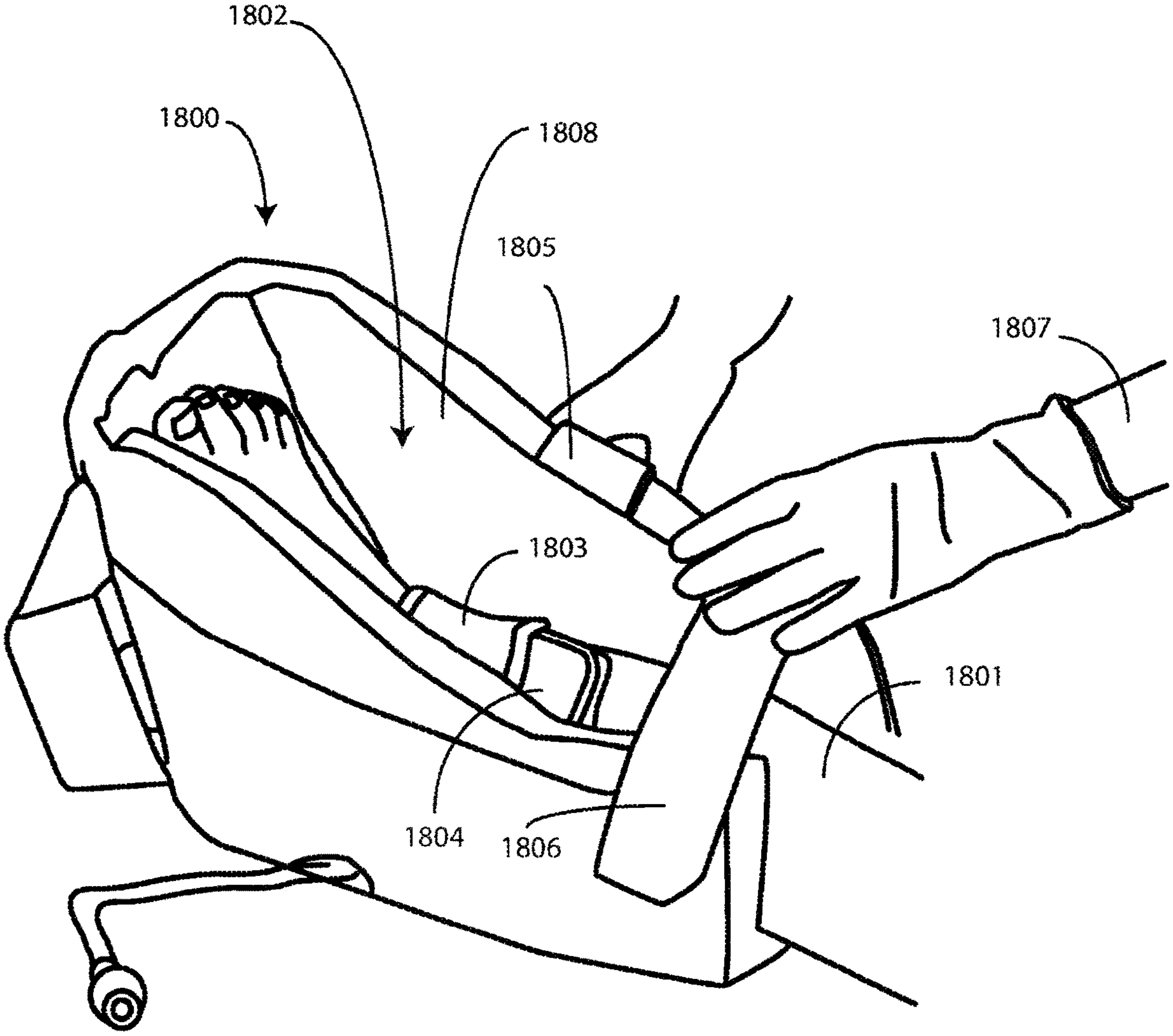
FIG. 18 illustrates a patient's limb wearing one explanatory device in accordance with one or more embodiments of the disclosure.
Figure 19:
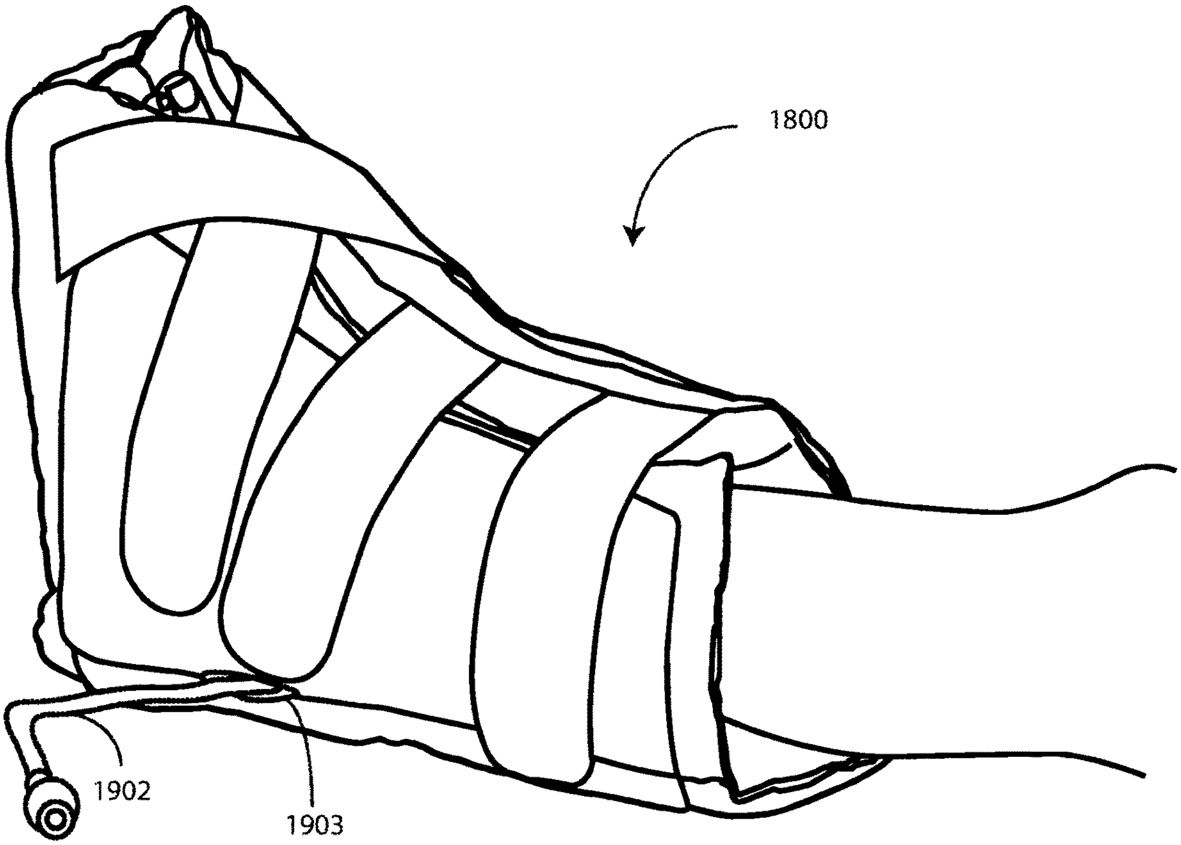
FIG. 19 illustrates one explanatory device configured in accordance with one or more embodiments of the disclosure upon being applied to a patient's limb.

Turning now to FIG. 18, illustrated therein is a method of using one or more devices configured in accordance with embodiments of the disclosure. When device 1800 is donned, the leg 1801 is laid into the receiving cavity 1802. The compression straps 1803,1804 formed by the first compression wrap member (301) and the second compression wrap member (302) are pulled up and over the leg 1801 from either side. The compression straps 1803,1804 are then connected together as described above. In one embodiment, the compression straps 1803,1804 are all that is needed to secure the device 1800 to the patient's leg 1801. Use of the fastening straps 1805,1806 further secure the device 1800 to the leg 1801.

Where used, a health care services provider 1807 can then wrap the fastening straps 1805,1806 across the leg insertion aperture 1808 to retain the device to the patient's leg 1801. The result of this wrapping is shown in FIG. 19. As shown in FIG. 19, the connection tube 1902 passes through aperture 1903, thereby eliminating any opportunity for the connection tube 1902 to touch the patient's skin. This reduces the chances of skin breakdown while the patient is wearing the device 1800.

Figure 20:
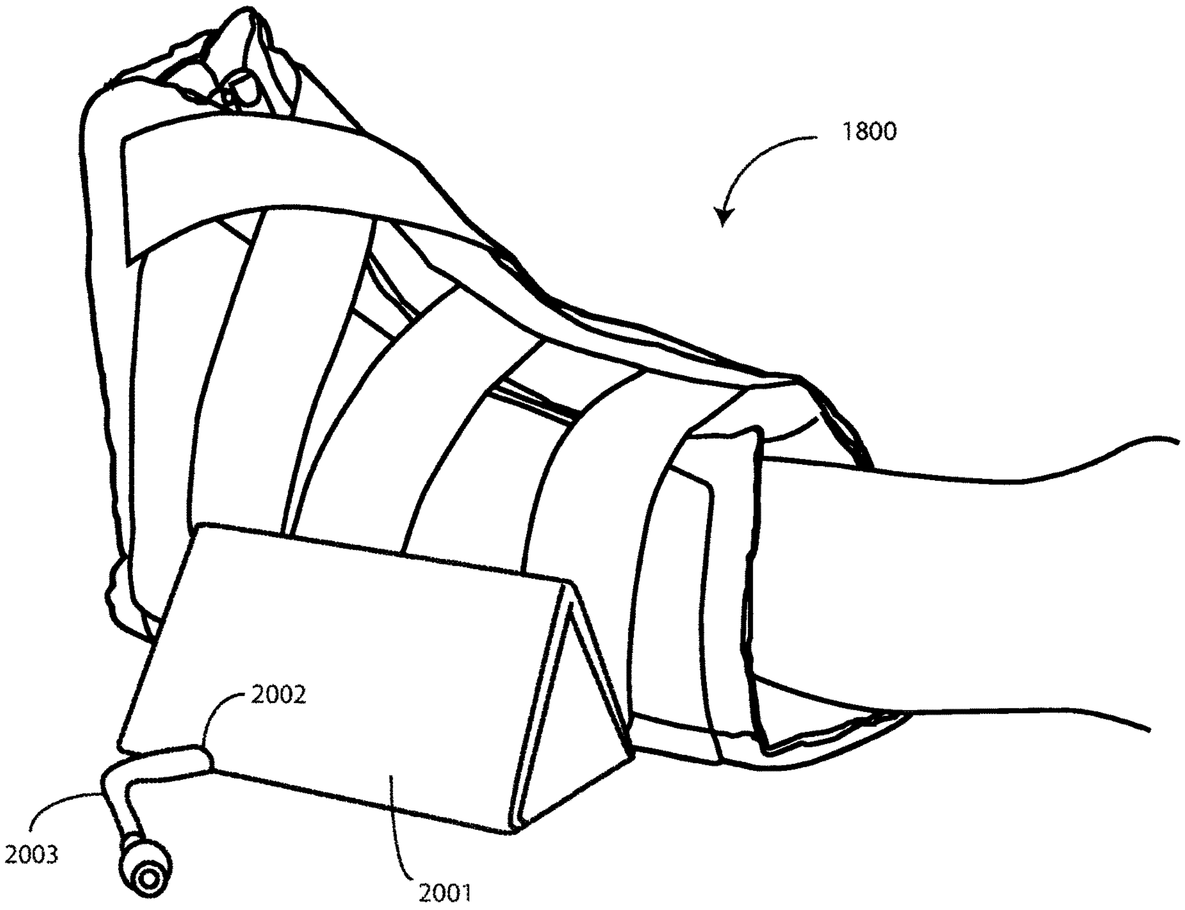
FIG. 20 illustrates one explanatory device in accordance with one or more embodiments of the disclosure upon being applied to a patient's limb.

Accessories can be provided for devices in accordance with embodiments of the disclosure. Turning now to FIG. 20, illustrated therein is one such example. A rehabilitation system includes a device 1800 in accordance with embodiments of the disclosure and a bolster 2001. In this embodiment, the bolster 2001 has been placed beside the device 1800 to provide resistance to rotational motion of the patient's leg. Said differently, the bolster 2001 is configured to stabilize the device 1800 rotationally when worn by a patient.

In this illustrative embodiment, the bolster 2001 is generally triangular in cross section and provides an "ambidextrous" stabilizing wedge that can be placed on either side of the device 1800. In one embodiment, a health care services provider (1807) is instructed to place a first bolster on one side of the device 1800 and a second bolster on the other side of the device 1800. In other embodiments, a single bolster 2001 can be used as shown in FIG. 20. While a triangular cross section of the bolster 2001 is shown in this illustrative embodiment, other cross sectional shapes will be obvious to those of ordinary skill in the art having the benefit of this disclosure.

In one embodiment, the bolster 2001 is attached to the device 1800. For example an edge of the bolster 2001 can be stitched to a seam of the leg engaging section of the device 1800. However, in other embodiments, the bolster 2001 can be completely separated from the device 1800 so as to be used only when circumstances warrant. In the illustrative embodiment of FIG. 20, the bolster 2001 includes a fastener that is complementary to a fastener disposed on an exterior of the leg engaging section of the device 1800. For example, where the leg engaging section includes one of a hook fastener or a loop fastener, a complementary fastener can be disposed on the exterior of the bolster 2001 to attach the two components together. In such a configuration, the bolster 2001 can be attached to the device 1800 as necessary, but can be removed when not needed.

In this illustrative embodiment, the bolster 2001 has been configured with a channel 2002 configured to permit the connection tube 2003 to pass from the device 1800 through the channel 2002. Accordingly, in this illustrative embodiment, the channel 2002 is configured with a shape that is complementary to that of the connection tube 2003. Those of ordinary skill in the art having the benefit of this disclosure will realize that the channel 2002 could take any of a variety of shapes. For example, the channel 2002 may be much wider than the connection tube 2003 so as to permit the connection tube 2003 to be placed at various lateral locations without moving the bolster 2001.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A device, comprising:

a leg engaging section intersecting a foot engaging section, at least the leg engaging section comprising a compressible cushion layer;

a first compression wrap member and a second compression wrap member, each attached to the leg engaging section at different locations interior to a first side of the leg engaging section and a second side of the leg engaging section; and one or more fastening straps, affixed to and extending from the leg engaging section; and the leg engaging section defining at least one channel to permit a connection tube to exit the device.

2. The device of claim 1, further comprising one or more other fastening straps, affixed to, and extending from, the leg engaging section, the foot engaging section, or combinations thereof.

3. The device of claim 2, the one or more fastening straps comprising at least one fastening strap extending from a first side of the device and at least one other fastening strap extending from another side of the device.

4. The device of claim 2, the first compression wrap member comprising an edge defining a plurality of attachment tabs.

5. The device of claim 1, further comprising an inflatable bladder that is selectively inflatable through a connection tube exiting the inflatable bladder at a non-orthogonal angle.

6. The device of claim 5, the leg engaging section defining at least one additional channel to permit at least one additional connection tube to exit the device.

7. The device of claim 6, further comprising at least one additional inflatable bladder, wherein the inflatable bladder and the at least one additional inflatable bladder are sequentially inflatable.

8. The device of claim 6, the connection tube and the at least one additional connection tube coupled to a common tube exterior to the device.

9. The device of claim 6, the connection tube and the at least one additional connection tube coupled to a common tube interior to the device.

10. The device of claim 1, the compressible cushion layer comprising an organic batting.

11. The device of claim 1, the compressible cushion layer comprising an inorganic batting.

12. The device of claim 1, further comprising an inflatable bladder disposed within a sleeve of the leg engaging section.

13. The device of claim 1, further comprising a port extending from the at least one channel.

14. The device of claim 1, wherein the at least one channel is wider than the connection tube.

15. The device of claim 1, further comprising a bolster.

16. The device of claim 15, wherein the bolster is configured to stabilize the device rotationally.

17. The device of claim 16, the device comprising a fastener disposed on an exterior of the leg engaging section and the bolster comprising a complementary fastener disposed on an exterior of the bolster.

18. The device of claim 1, the one or more fastening straps comprising four fastening straps.

19. The device of claim 1, the first compression wrap member and the second compression wrap member manufactured from a stretchable material.

20. The device of claim 1, wherein the at least one channel is reinforced about its perimeter.

* * * * *